US011175553B2

(12) United States Patent
Yu et al.

(10) Patent No.: US 11,175,553 B2
(45) Date of Patent: Nov. 16, 2021

(54) CIRCUIT SUBSTRATE AND DISPLAY DEVICE

(71) Applicants: Chongqing BOE Optoelectronics Technology Co., Ltd., Chongqing (CN); BOE TECHNOLOGY GROUP CO., LTD., Beijing (CN)

(72) Inventors: Guangqi Yu, Beijing (CN); Zhifu Dong, Beijing (CN); Xiaolin Wang, Beijing (CN); Jungho Park, Beijing (CN); Shouqiang Zhang, Beijing (CN); Pengyue Zhang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/916,712

(22) Filed: Jun. 30, 2020

(65) Prior Publication Data
US 2021/0003897 A1 Jan. 7, 2021

(30) Foreign Application Priority Data
Jul. 1, 2019 (CN) .......................... 201921007903.7

(51) Int. Cl.
*G02F 1/1368* (2006.01)
*G02F 1/1362* (2006.01)

(52) U.S. Cl.
CPC ...... *G02F 1/136286* (2013.01); *G02F 1/1368* (2013.01)

(58) Field of Classification Search
CPC ................................................. G02F 1/136286
See application file for complete search history.

(56) References Cited

U.S. PATENT DOCUMENTS

| 2014/0132876 A1* | 5/2014 | Yang | G02F 1/1368 349/46 |
| 2017/0219895 A1* | 8/2017 | Yu | G02F 1/1368 |
| 2020/0126470 A1* | 4/2020 | Gao | G09G 3/2085 |
| 2021/0003897 A1* | 1/2021 | Yu | G02F 1/136286 |

\* cited by examiner

*Primary Examiner* — Sang V Nguyen
(74) *Attorney, Agent, or Firm* — McDermott Will & Emery LLP

(57) ABSTRACT

A circuit substrate has a first area and a second area. The second area includes a rounded corner region and a first rectangular region connected to the rounded corner region. The first rectangular region extends along a second direction. The circuit substrate includes: a plurality of gate lines disposed in the first area, and a gate driver on array (GOA) circuit disposed in the second area. The GOA circuit including at least one GOA unit disposed in the rounded corner region and a GOA unit disposed in the first rectangular region. Along the first direction, a length of a GOA unit in the rounded corner region is less than a length of the GOA unit in the first rectangular region; and along the second direction, a width of the GOA unit in the rounded corner region is greater than a width of the GOA unit in the first rectangular region.

17 Claims, 21 Drawing Sheets

CIRCUIT SUBSTRATE AND DISPLAY DEVICE

CROSS-REFERENCE TO RELATED APPLICATION

This application claims priority to Chinese Patent Application No. 201921007903.7, filed on Jul. 1, 2019, which is incorporated herein by reference in its entirety.

TECHNICAL FIELD

The present disclosure relates to the field of display technologies, and in particular, to a circuit substrate and a display device.

BACKGROUND

In a display device, a gate driver circuit includes a plurality of shift registers, and each shift register corresponds to a row of pixels. The shift register may generate a driving signal, and transmits the driving signal to a gate line coupled to the row of pixels. As a result, pixels in the row are turned on, so that the display device displays an image. In the gate driver on array (GOA) technology, the array substrate of the display device has a peripheral region, and the gate driver circuit is disposed in the peripheral region on the array substrate. The GOA technology can make the display device omit a space for bonding a Gate IC, which can realize a narrow bezel of the display device. In the gate driver circuit using the GOA technology, the shift registers are called GOA units.

SUMMARY

In one aspect, a circuit substrate is provided, and the circuit substrate has a first area and a second area extending along at least part of an edge of the first area; the second area including a rounded corner region and a first rectangular region connected to the rounded corner region; the first rectangular region extending along a second direction. The circuit substrate includes a plurality of gate lines and a gate driver on array (GOA) circuit. The plurality of gate lines are disposed in the first area, each gate line extends in a first direction perpendicular to the second direction. The GOA circuit is disposed in the second area and connected to at least part of the plurality of gate lines. The GOA circuit includes at least one GOA unit disposed in the rounded corner region and a GOA unit disposed in the first rectangular region. Along the first direction, a length of a GOA unit in the rounded corner region is less than a length of the GOA unit in the first rectangular region; and along the second direction, a width of the GOA unit in the rounded corner region is greater than a width of the GOA unit in the first rectangular region.

In some embodiments, the second area further includes a second rectangular region extending along the first direction, the rounded corner region includes a first sub-region and a second sub-region. The first sub-region is connected to the first rectangular region, and the second sub-region is connected to the second rectangular region. The at least one GOA unit disposed in the rounded corner region includes a first GOA unit disposed in the first sub-region, and a second GOA unit disposed in the second sub-region. A length of the first GOA unit is less than a length of the second GOA unit, and a width of the first GOA unit is greater than a width of the second GOA unit.

In some embodiments, a first central angle of the first sub-region is smaller than a second central angle of the second sub-region.

In some embodiments, the first sub-region has a first central angle in a range from approximately 5° to approximately 45°.

In some embodiments, the rounded corner region further includes a third sub-region between the first sub-region and the second sub-region. The rounded corner region further includes a third sub-region between the first sub-region and the second sub-region. A length of the third GOA unit is greater than the length of the first GOA unit, and less than the length of the second GOA unit; and a width of the third GOA unit is less than the width of the first GOA unit, and greater than the width of the second GOA unit.

In some embodiments, a first central angle of the first sub-region is less than a second central angle of the second sub-region, and a third central angle of the third sub-region is less than the first central angle.

In some embodiments, the rounded corner region further includes a fourth sub-region between the third sub-region and second sub-region. The at least one GOA unit disposed in the rounded corner region further includes a fourth GOA unit. A length of the fourth GOA unit is greater than the length of the third GOA unit and less than the length of the second GOA unit; and a width of the fourth GOA unit is less than the width of the third GOA unit, and greater than the width of the second GOA unit.

In some embodiments, a length of the fourth GOA unit is greater than the length of the third GOA unit and less than the length of the second GOA unit; and a width of the fourth GOA unit is less than the width of the third GOA unit, and greater than the width of the second GOA unit.

In some embodiments, the rounded corner region further includes a fifth sub-region between the third sub-region and the fourth sub-region. The at least one GOA unit disposed in the rounded corner region further includes a fifth GOA unit. A length of the fifth GOA unit is greater than the length of the third GOA unit, and less than the length of the fourth GOA unit; and a width of the fifth GOA unit is less than the width of the third GOA unit, and greater than the width of the fourth GOA unit.

In some embodiments, a first central angle of the first sub-region is less than a third central angle of the third sub-region, the third central angle is less than a fourth central angle of the fourth sub-region, and the fourth central angle is less than a second central angle of the second sub-region; and a fifth central angle of the fifth sub-region is less than the third central angle.

In some embodiments, the first GOA unit and the second GOA unit are electrically connected to corresponding gate lines.

In some embodiments, the first GOA unit includes a first output sub-circuit connected to a corresponding gate line; the first input sub-circuit includes a plurality of first transistors arranged in a plurality of rows each extending along the first direction.

In some embodiments, the plurality of first transistors of the first input sub-circuit are arranged in a first row and a second row. The first row of first transistors is arranged in a first distribution region, and the second row of first transistors is arranged in a second distribution region. Along the first direction, a length of the first distribution region is equal to or substantially equal to the length of the first GOA unit. Along the second direction, a sum of a width of the first distribution region and a width of the second distribution region is equal to or substantially equal to the width of the first GOA unit.

In some embodiments, the second GOA unit includes a second output sub-circuit connected to a corresponding gate line. The second output sub-circuit includes a plurality of second transistors, and the plurality of second transistors are arranged in a row extending along the first direction.

In some embodiments, along the second direction, a width of the second distribution region is equal to or substantially equal to the width of the second distribution region.

In some embodiments, the rounded corner region includes a plurality of sub-regions arranged along the edge of the first area. The at least one GOA unit in the rounded corner region includes a plurality of GOA units that are arranged in the plurality of sub-regions. In a direction along the edge of the first area away from the first rectangular region, lengths of the plurality of GOA units gradually increase, and widths of the plurality of GOA units gradually decrease.

In some embodiments, the second area further includes a second rectangular region extending along the first direction, and the rounded corner region is connected to the second rectangular region. The GOA circuit further includes a GOA unit disposed in the second rectangular region, a length and a width of the GOA unit in the second rectangular region and/or the length and the width of the GOA unit in the first rectangular region are substantially equal to a length and a width of a GOA unit in a sub-region of the rounded corner region that is connected to the second rectangular region, respectively.

In another aspect, a display device is provided, which includes the aforementioned circuit substrate.

BRIEF DESCRIPTION OF THE DRAWINGS

In order to describe technical solutions in the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, etc. that the embodiments of the present disclosure relate to.

DETAILED DESCRIPTION

Figure 1:
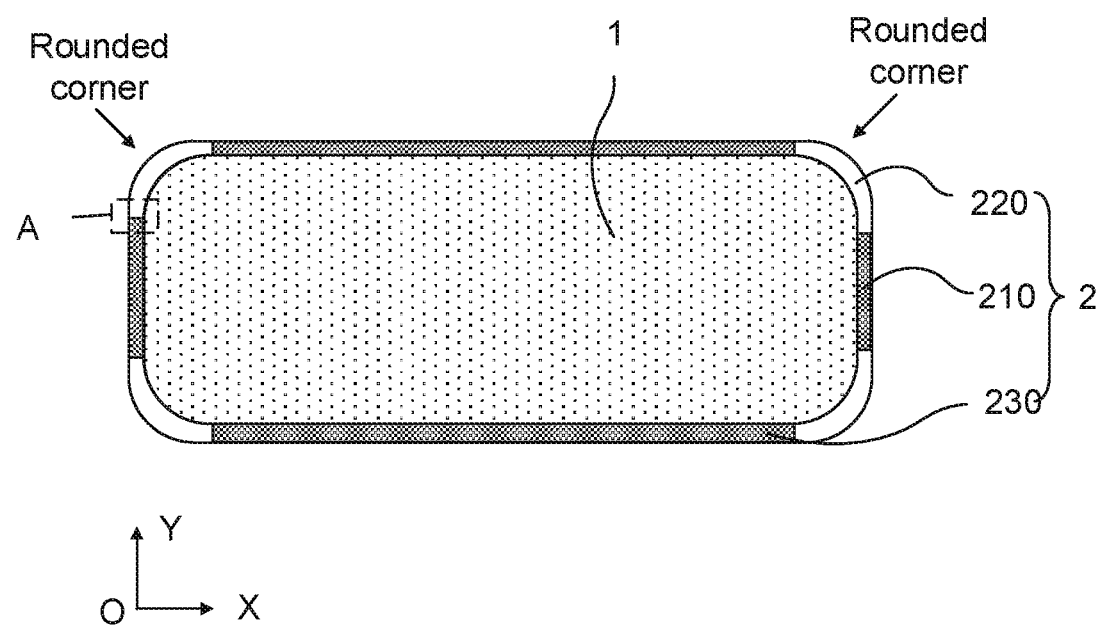
FIG. 1 is a schematic diagram of a circuit substrate, in accordance with some embodiments.
Figure 2:
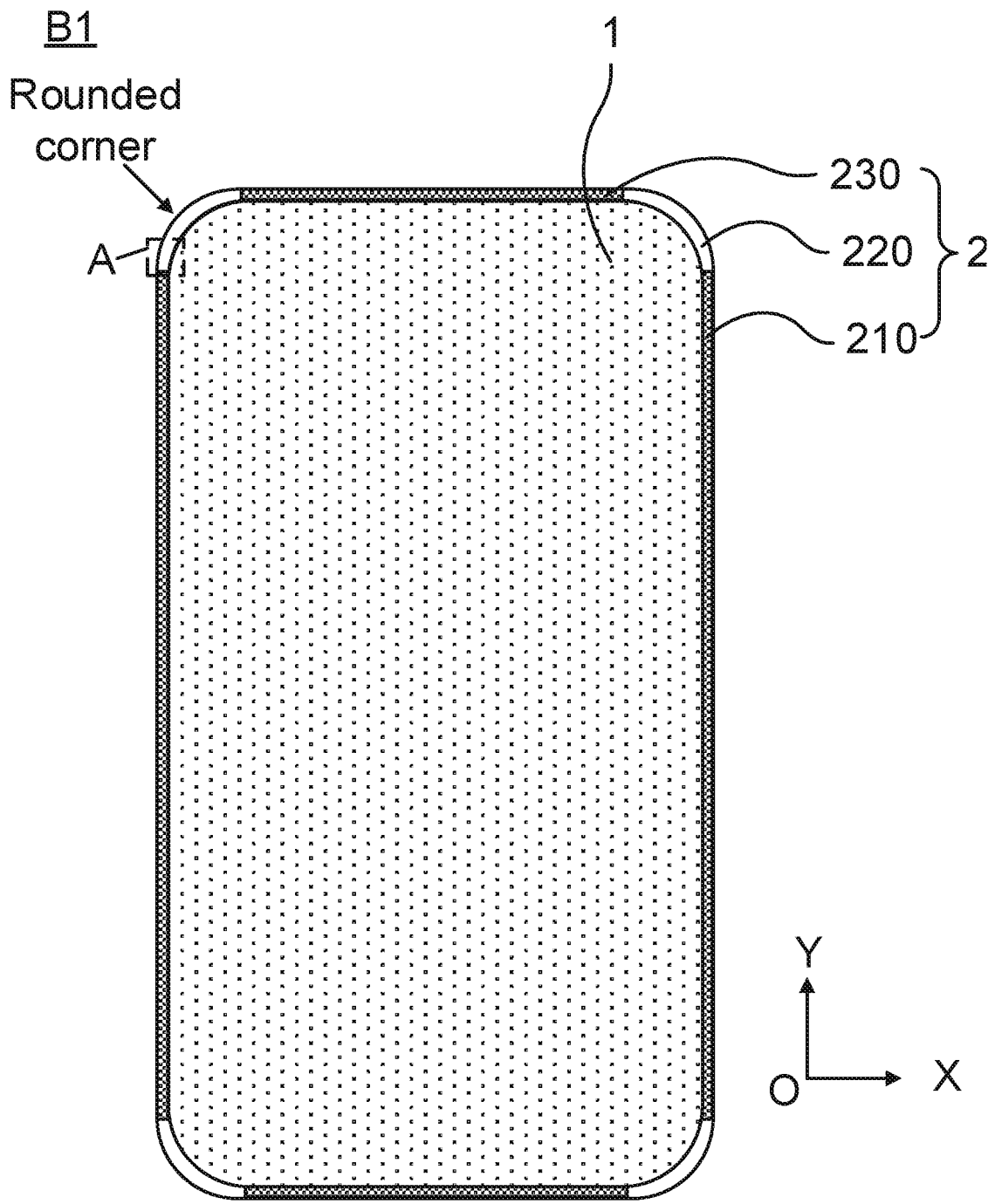
FIG. 2 is a schematic diagram of another circuit substrate, in accordance with some embodiments.

Technical solutions in some embodiments of the present disclosure will be described clearly and completely in combination with accompanying drawings. However, the described embodiments are merely some but not all embodiments of the present disclosure. All other embodiments obtained on a basis of embodiments of the present disclosure by a person of ordinary skill in the art shall be included in the protection scope of the present disclosure.

Exemplary embodiments are described herein with reference to cross-sectional diagrams and/or plan diagrams as idealized exemplary drawings. In the drawings, thicknesses of layers and regions may be exaggerated for clarity. Therefore, variations in shapes with respect to the drawings due to, for example, manufacturing techniques and/or tolerances are conceivable. Therefore, the exemplary embodiments should not be construed as being limited to the shapes of the regions shown herein, but include shape deviations due to, for example, manufacturing. Therefore, the regions illustrated in the drawings are schematic and their shapes are not intended to illustrate the actual shapes of the regions in an apparatus and are not intended to limit the scope of the exemplary embodiments.

Unless the context requires otherwise, the term "comprise" and other forms thereof such as the third-person singular form "comprises" and the present participle form "comprising" in the description and the claims are construed as an open and inclusive meaning, i.e., "included, but not limited to". In the description of the specification, references made to the terms "one embodiment," "some embodiments," and "exemplary embodiments," "example," and "specific example" or "some examples" and the like are intended to refer that specific features and structures, materials or characteristics described in connection with the embodiment or example that are included in at least one embodiment or example of the present disclosure. The schematic expression of the terms does not necessarily refer to the same embodiment or example. Moreover, the specific features, structures, materials or characteristics described may be included in any suitable manner in any one or more embodiments or examples.

In addition, the terms "first" and "second" are for illustration purposes only, and are not to be construed as indicating or implying relative importance or implied reference to the quantity of indicated technical features. Thus, features defined by the terms "first" and "second" may explicitly or implicitly include one or more of the features. In the description of the embodiments of the present disclosure, the term "plurality" means two or more unless otherwise specified.

In addition, when it is described that an element is "coupled" or "connected" to another element, the element may be directly coupled or directly connected to the other element or coupled or connected to the other element through a third element. The expression of A and/or B includes the following combinations: only A, only B, and a combination of A and B. "About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Some embodiments of the present disclosure provide a display device. The display device may be a product having a display function, such as a mobile phone, a laptop, a tablet computer, a personal digital assistant (PDA), an on-board computer, a games console or a TV. The display device may include or be a display panel 001 shown in FIG. 5.

Figure 5:
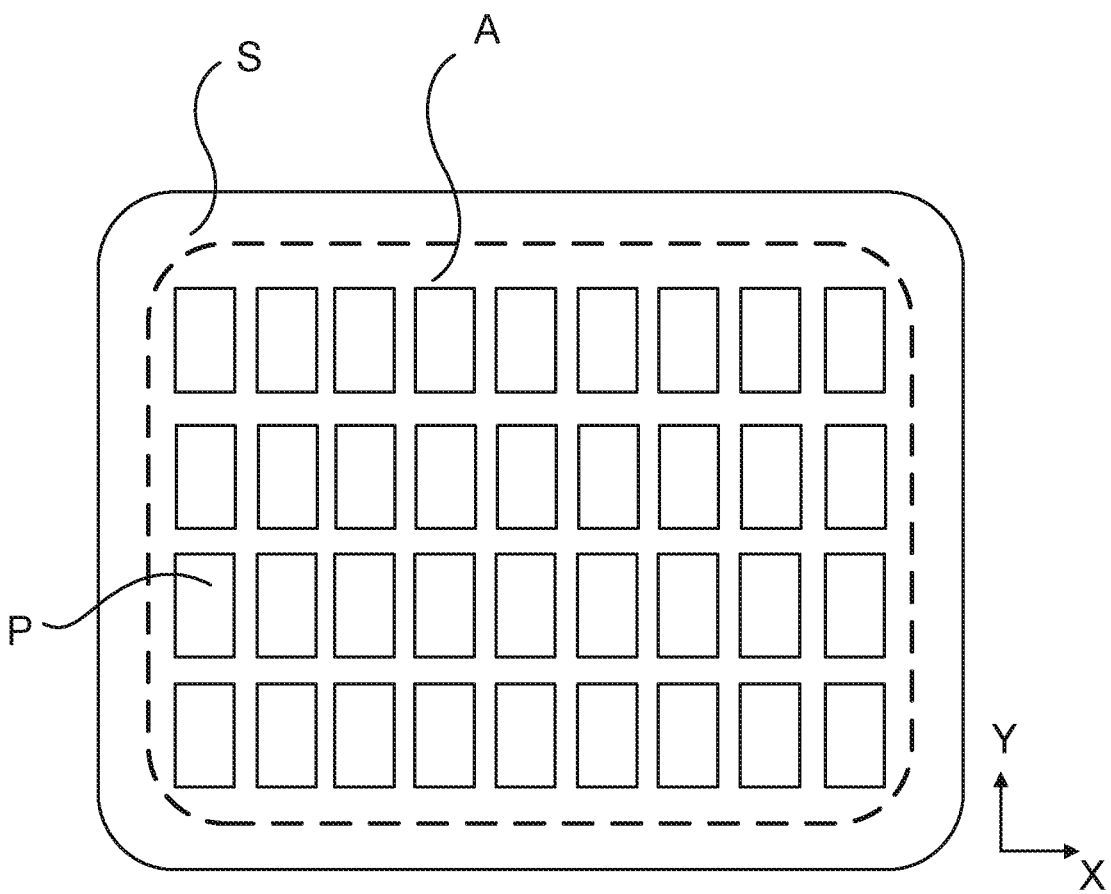
FIG. 5 is a schematic top view of a display panel, in accordance with some embodiments.

Referring to FIG. 5, the display panel 001 has an active area A and a peripheral area S disposed on at least one side of the active area A. It can be understood that the display panel 001 in FIG. 5 is illustrated by taking an example where the active area A is surrounded by the peripheral area S. For another example, the peripheral area S may be disposed at one or more sides, but not all sides, of the active area A.

As shown in FIG. 5, the display panel 001 includes a plurality of sub-pixels P disposed in the active area A. The plurality of sub-pixels P may include first sub-pixels of a first color, second sub-pixels of a second color and third sub-pixels of a third color. For example, the first color, the second color and the third color are red, green and blue, respectively. The plurality of sub-pixels P may further include fourth sub-pixels of a white color.

As shown in FIG. 5, the plurality of sub-pixels P may be arranged in an array, or the plurality of sub-pixels P may be arranged in other forms. For ease of description, sub-pixels P arranged in a row along a first direction OX are called a row of sub-pixels, and sub-pixels P arranged in a column along a second direction OY are called a column of sub-pixels. The first direction OX is perpendicular to the second direction OY.

As shown in FIGS. 1 to 3, 5, 8 10A, and 11 to 15, the display panel 001 includes a circuit substrate B1. As shown in FIGS. 1 to 3 and 10A, the circuit substrate B1 has a first area 1 and a second area 2 extending along at least part of an edge of the first area 1. The active area A of the display panel 001 corresponds to the first area 1 of the circuit substrate B1, and the peripheral area S of the display panel 001 corresponds to the second area 2 of the circuit substrate B1.

It can be understood that the circuit substrate B1 in FIGS. 1 to 3 and 10A is illustrated by taking an example where the second area 2 is arranged along the entire edge of the first area 1. For another example, the second area 2 may be arranged along part of the edge of the first area 1. For example, the second area 2 may be disposed at one or more sides, but not all sides, of the first area 1.

The circuit substrate B1 may include a plurality of pixel driver circuits and signal lines such as data lines and gate lines, all of which are disposed in the first area 1. It will be noted that each sub-pixel may include a pixel driver circuit. The pixel driver circuit may include at least one thin film transistor (TFT). For example, pixel driver circuits in a same row are electrically connected to a gate line, that is, a row of pixel driver circuits is connected to one gate line. Pixel driver circuits in a same column are electrically connected to a data line, that is, a column of pixel driver circuits is connected to one data line.

Figure 10A:
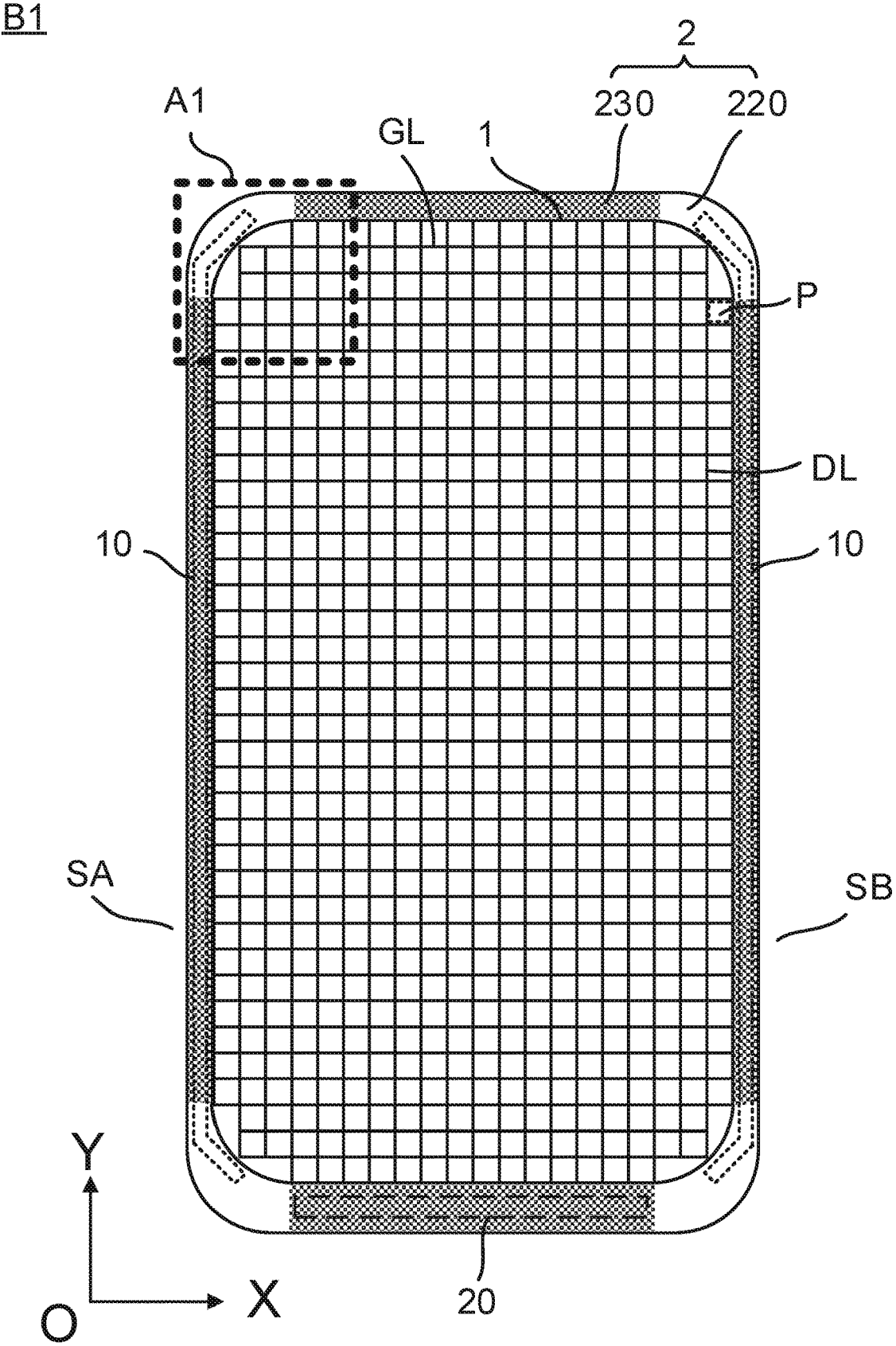
FIG. 10A is a schematic top view of a circuit substrate, in accordance with some embodiments.

For example, as shown in FIG. 10A, the circuit substrate B1 includes a plurality of gate lines GL and a plurality of data lines DL located in the first area 1. The gate lines GL are substantially parallel to each other, and the data lines DL are substantially parallel to each other. Orthographic projections of the gate lines GL on a plane parallel to the circuit substrate B1 are substantially perpendicular to orthographic projections of the data lines DL on the plane. It will be noted that the gate lines GL and the data lines DL are not electrically connected and are arranged in different layers in the circuit substrate B1.

The circuit substrate may further include wires and driver circuits such as a data driver circuit and a gate driver circuit, all of which are disposed in the second area 2. The gate driver circuit may include a plurality of gate driver on array (GOA) units. It will be noted that the circuit substrate B1 may include one or more gate driver circuits. For example, the circuit substrate B1 includes two gate driver circuits, and the two gate driver circuits may be arranged in two opposite regions of the second area 2, respectively. In addition, the two gate driver circuits may be arranged along two opposite edges of the first area 1, respectively.

When the display panel 001 display images, the gate driver circuit may transmit gate scanning signals to the plurality of pixel driver circuits through the gate lines, and the plurality of pixel driver circuits drive the display panel 001 to display images.

In some examples, as shown in FIGS. 1 to 3 and 10A, the circuit substrate B1 is substantially in a shape of a rounded rectangle with rounded corners. It will be noted that when the corner is described as being rounded, the corner may have, for example, a curved, trimmed, diagonal, or step shape or a combination of these.

For example, as shown in FIGS. 1 to 3 and 10A, the second area 2 includes at least one rounded corner region 220, first rectangular regions 210 extending along the second direction OY, and second rectangular regions 230 extending along the first direction OX. The rounded corner region 220 may be connected to a first rectangular region 210 and a second rectangular region 230. The rounded corner region 3 may have a curved, trimmed, diagonal, or step shape or a combination of these.

For another example, the left and right sides of the circuit substrate B1 are curved sides. The second area 2 includes two opposite rounded corner region 220 and two opposite second rectangular regions 210 extending along the first direction OX. Each rounded corner region 220 may be connected to the two second rectangular regions 210. The rounded corner region 220 may have a curved, trimmed, diagonal, or step shape or a combination of these.

Figure 3:
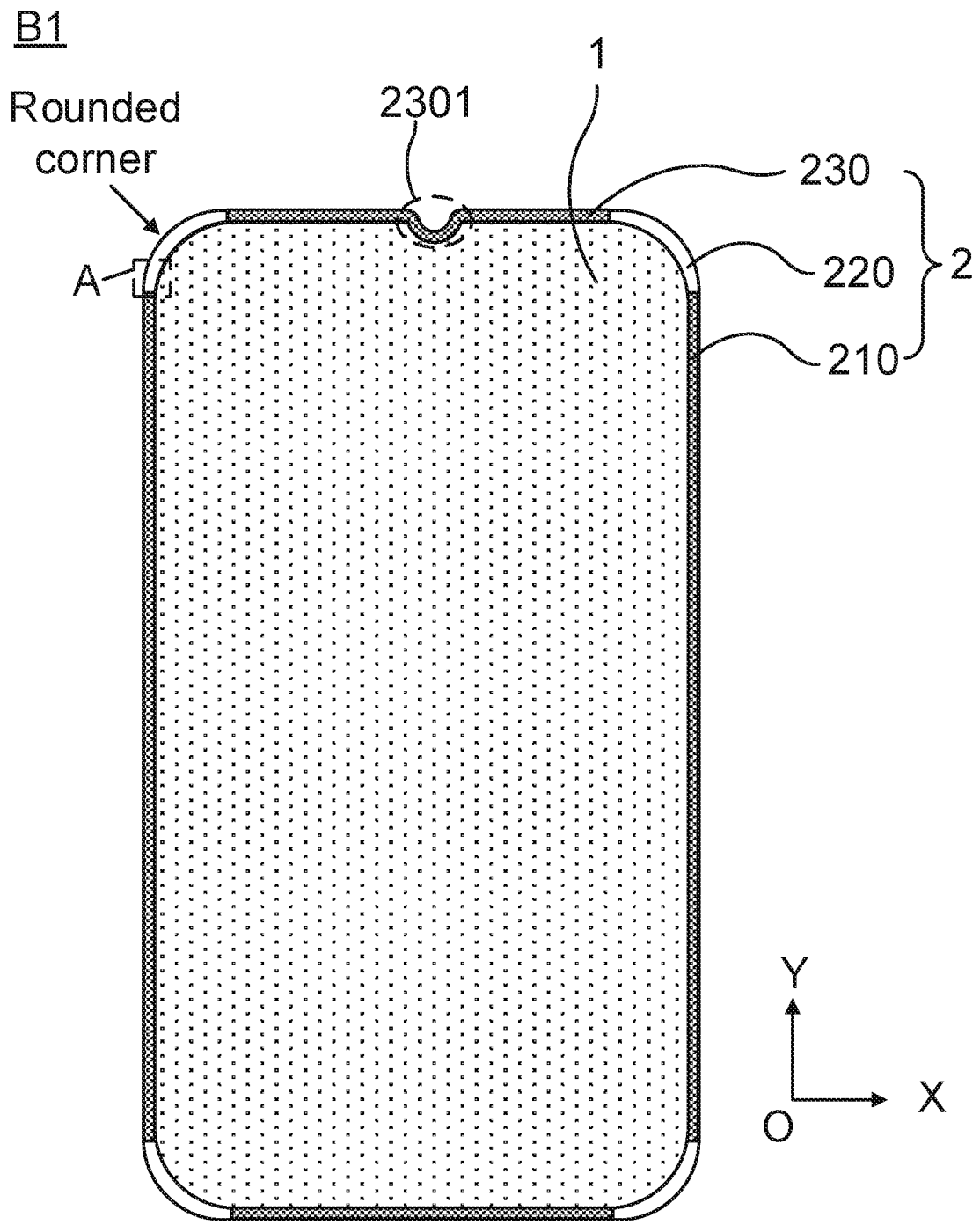
FIG. 3 is a schematic diagram of yet another circuit substrate, in accordance with some embodiments.

As shown in FIG. 3, the second rectangular region 230 may include at least one curved sub-region 2301 (for example, the notch), and the curved sub-region 2301 is connected to two adjacent rectangular sub-regions whose extending directions are parallel.

As shown in FIG. 10A, the circuit substrate B1 includes at least one GOA circuit 10, and each GOA circuit 10 includes a plurality of GOA units. The plurality of GOA units may be arranged in the first rectangular regions 210 and the at least one rounded corner region 220. The GOA units in the first rectangular region 210 may be arranged in one or more columns extending along the second direction OY. For another example, the GOA units may be further arranged in the second rectangular regions 230. The GOA units may not be provided in the at least one curved sub-region 2301.

The structures of the display panel 001 and its circuit substrate B1 are illustrated below based on the type of the display panel 001.

The display panel 001 may be a non-self-luminescent display panel, such as a liquid crystal display (LCD) panel. Alternatively, the display panel 001 may be a self-luminescent display panel, such as an organic light-emitting diode (OLED) display panel, a quantum dot light-emitting diode (QLED) display panel, a micro light-emitting diode (Micro LED) display panel or a mini light-emitting diode (Mini LED) display panel.

Figure 6:
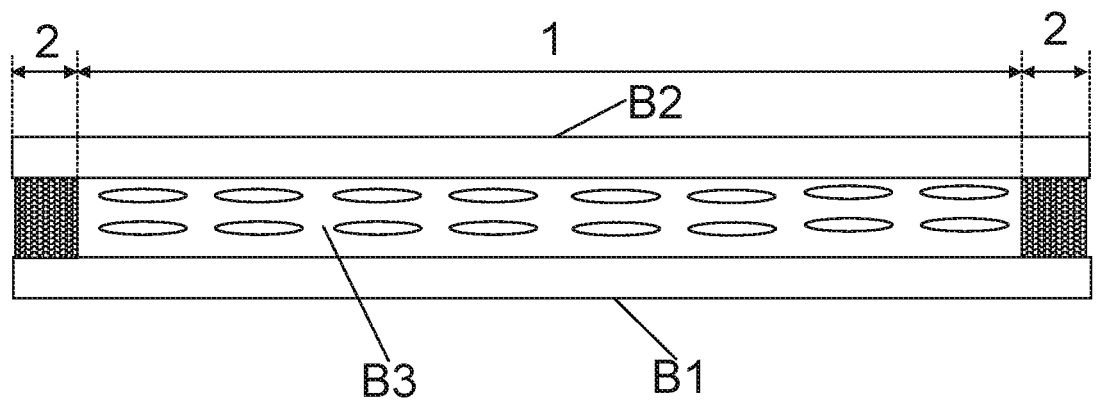
FIG. 6 is a schematic section of a display panel, in accordance with some embodiments.

In some embodiments, the display panel 001 is the LCD panel. As shown in FIG. 6, the display panel 001 includes the circuit substrate B1 (i.e., an array substrate), an opposite substrate B2, and a liquid crystal layer B3 between the circuit substrate B1 and the opposite substrate B2.

Figure 7:
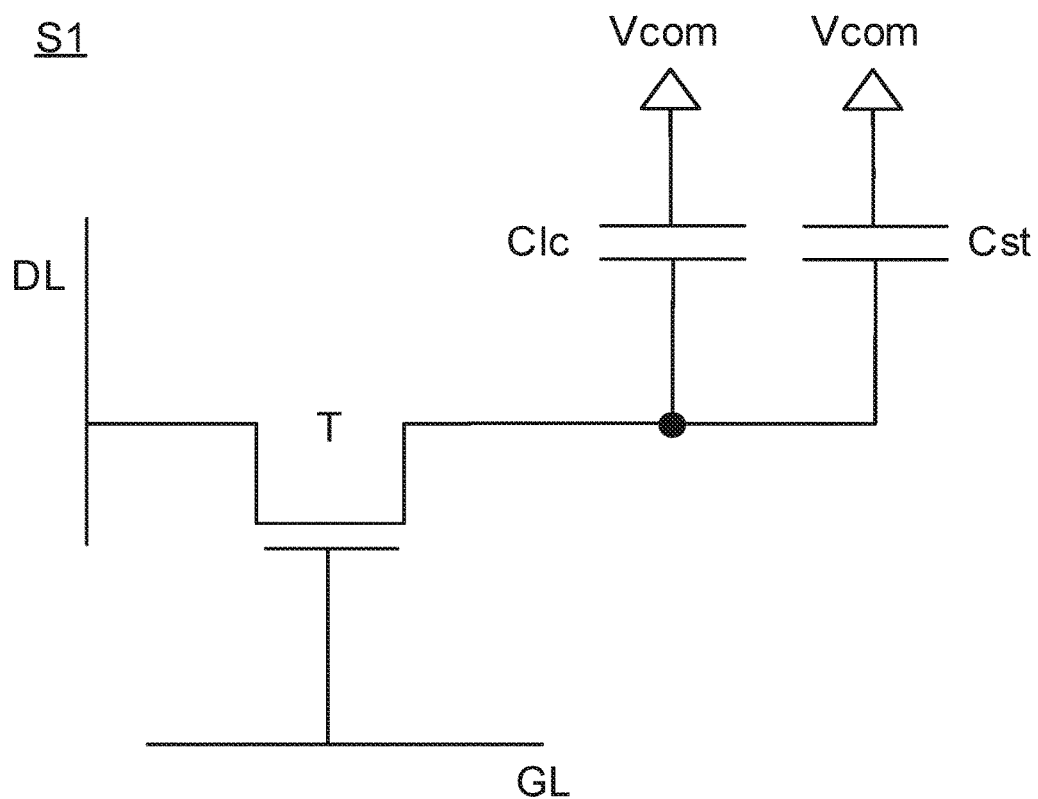
FIG. 7 is an equivalent circuit diagram of a pixel driver circuit, in accordance with some embodiments.

For example, the circuit substrate B1 includes a plurality of pixel driver circuits arranged in an array substantially, and each pixel driver circuit is included in a respective one of the plurality of sub-pixels P. As shown in FIG. 7, the pixel driver circuit S1 may include a transistor T (e.g., a thin film transistor), a liquid crystal capacitor Clc and a storage capacitor Cst. A first electrode of the transistor T is connected to a data line DL, and a second electrode of the transistor T is connected to a first electrode of the liquid crystal capacitor Clc. The first electrode of the transistor T may be one of a source and a drain of the transistor T, and the second electrode of the transistor T may be another one of the source and the drain.

It can be understood that in the pixel driver circuits S1 in the same row, and gates of the transistors T are electrically connected to the same gate line GL. In the pixel driver circuits S1 in the same column, first electrodes of the transistors T are connected to the same data line DL.

Part of a pixel electrode of a sub-pixel P may be served as the first electrode of the liquid crystal capacitor Clc of the sub-pixel P, and part of a common electrode of the display panel 001 may be served as a second electrode of the liquid crystal capacitor Clc.

In some examples, the circuit substrate B1 includes both the pixel electrode of each sub-pixel P and the common electrode. In some other examples, the circuit substrate B1 includes the pixel electrode of each sub-pixel P, and the opposite substrate B2 includes the common electrode. The opposite substrate B2 is, for example, a color filter substrate.

Figure 8:
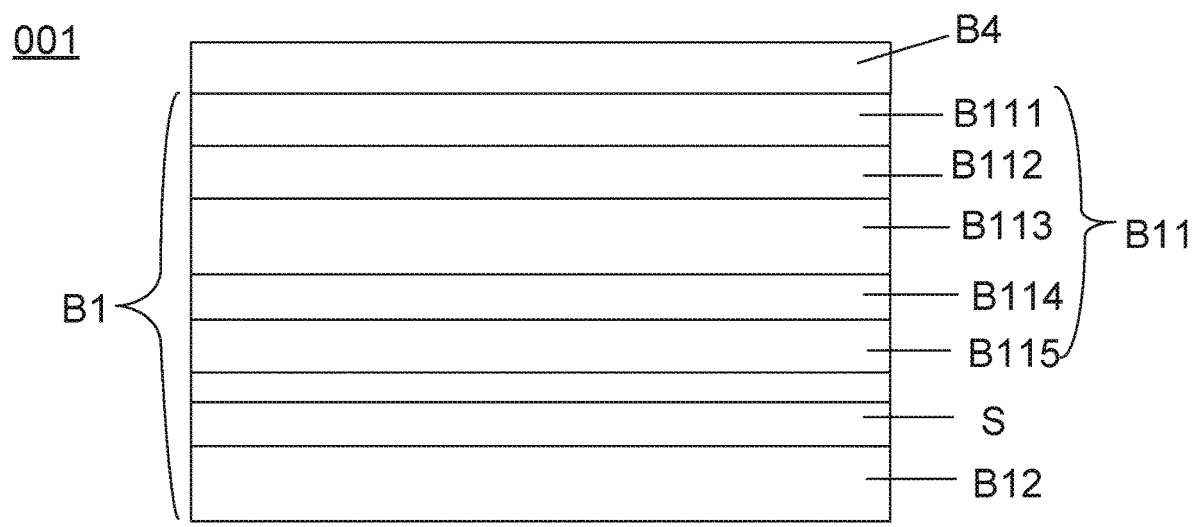
FIG. 8 is a schematic section of another display panel, in accordance with some embodiments.

In some embodiments, the display panel 001 is the self-luminescent display panel. For example, the self-luminescent display panel is the OLED display panel. As shown in FIG. 8, the display panel 001 includes the circuit substrate B1 and an encapsulation substrate B4. The encapsulation substrate B4 may include or be an encapsulation layer. Or, the encapsulation substrate B4 may include or be a rigid substrate.

The circuit substrate B1 may include a plurality of pixel driver circuits S2 and a plurality of light-emitting devices B11. Each pixel driver circuit S2 is included in a respective one of the plurality of sub-pixels P, and each light-emitting device B11 is included in a respective one of the plurality of sub-pixels P.

As shown in FIG. 8, the light-emitting device B11 includes a cathode B111, an anode B115, and a light-emitting functional layer between the cathode B111 and the anode B115. The light-emitting functional layer includes at least one organic light-emitting layer B113.

The light-emitting functional layer may further include at least one of an electron injection layer, an electron transport layer, a hole transport layer or a hole injection layer. For example, referring to FIG. 8, the light-emitting functional layer further include the hole transport layer B114 located between the organic light-emitting layer B113 and the anode B115, and the electron transport layer B112 located between the organic light-emitting layer B113 and the cathode B111. For another example, the light-emitting functional layer may further include the hole injection layer disposed between the hole transport layer B114 and the anode B115. For another example, the light-emitting functional layer may further include the electron injection layer disposed between the electron transport layer B112 and the cathode B111.

Figure 9:
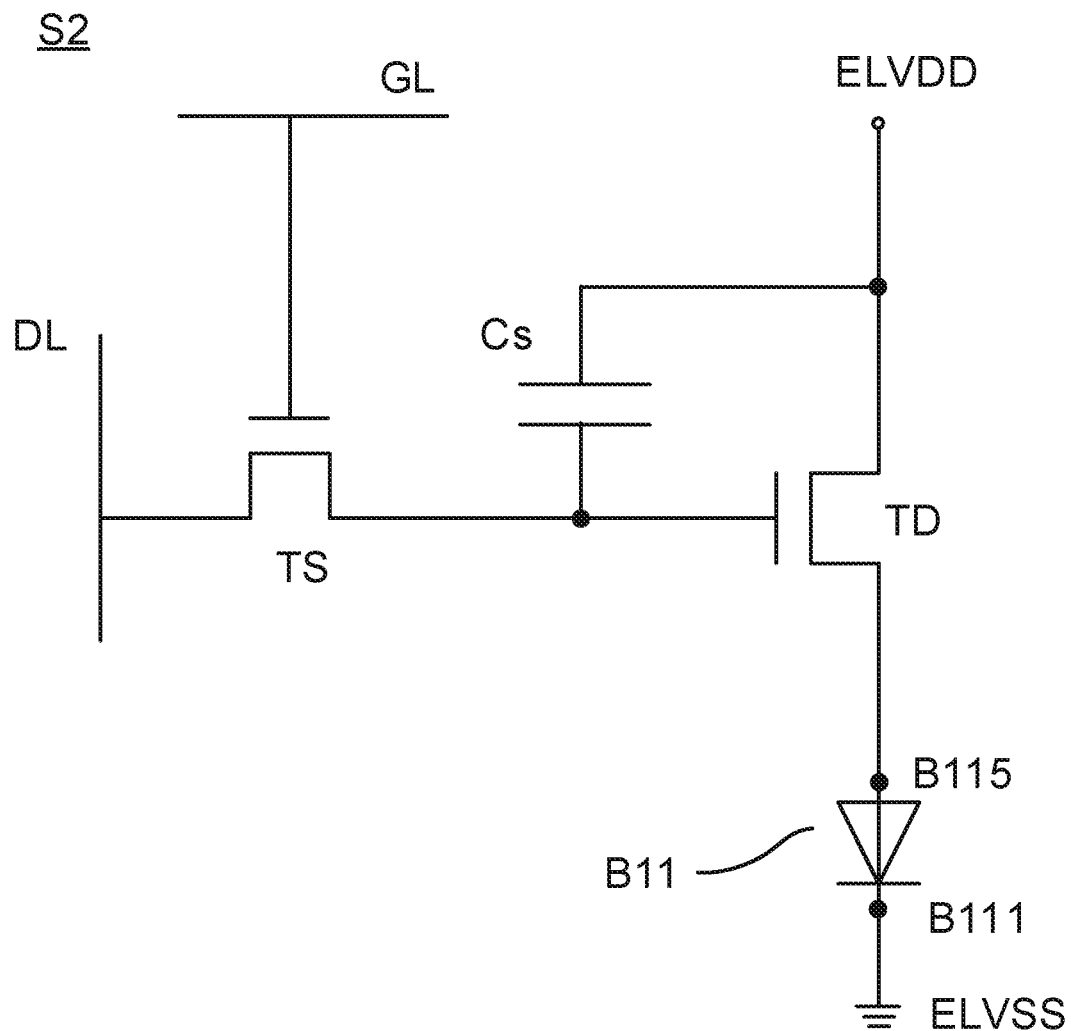
FIG. 9 is an equivalent circuit diagram of another pixel driver circuit, in accordance with some embodiments.

The pixel driver circuit S2 is disposed on a base B12. Referring to FIG. 9, the pixel driver circuit S2 includes a first transistor TS, a second transistor TD and a capacitor Cs. The second transistor TD is a driving transistor. A gate of the first transistor TS is electrically connected to the gate line GL, a first electrode of the first transistor TS is electrically connected to the data line DL, and a second electrode of the first transistor TS is connected to a first electrode of the capacitor Cs. A second electrode of the capacitor Cs is electrically connected to a first voltage terminal ELVDD. A first electrode of the second transistor TD is electrically connected to the first voltage terminal ELVDD, and a second electrode of the second transistor TD is electrically connected to the anode B115 of the light-emitting device B11. The cathode B111 of the light-emitting device B11 is electrically connected to a second voltage terminal ELVSS.

In the circuit substrate B1 of the display panel 001 of each type described above, as shown in FIG. 4, a wire 201 is provided in the second area 2 and is adjacent to an outer border 203 of the second area 2. The GOA units 202 may receive signals from a timing controller (TCON) through the wire 201. The GOA units 202 are arranged between the wire 201 and an inner border 204 of the second area 2.

Figure 4:
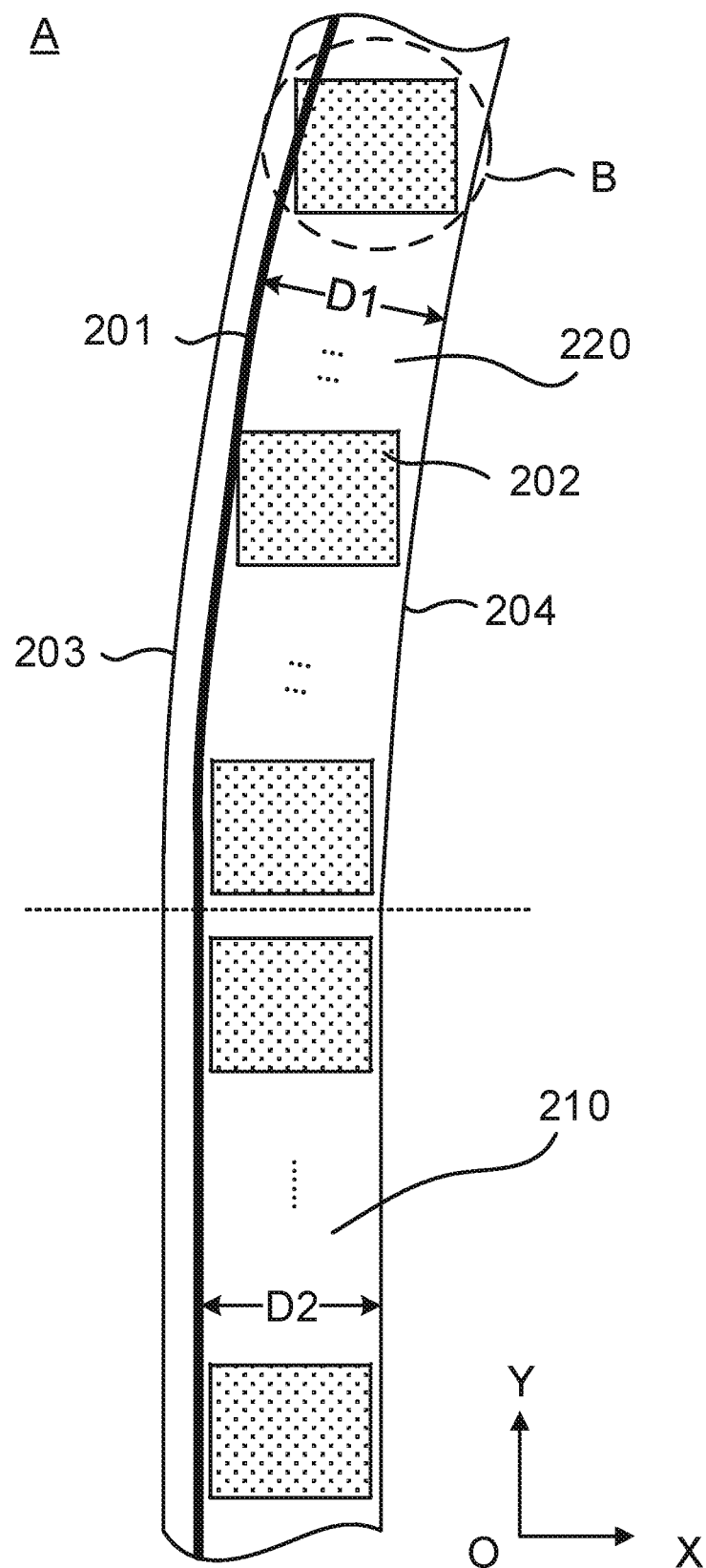
FIG. 4 is a schematic diagram of an exemplary arrangement of GOA units in the section A of FIG. 2.

In the related art, as shown in FIG. 4, the GOA units substantially share a same length in the first direction OX, and a same width in the second direction OY. In addition, a minimum distance D1 between the wire 201 and the inner border 204 of the rounded corner region 220 may be equal to a minimum distance D2 between the wire 201 and the inner border 204 of the first rectangular region 210. In this case, referring to the section B in FIG. 4, a GOA unit may overlap the wire 201 when the GOA units are arranged along the inner border 204 of the rounded corner region 220. In other words, the rounded corner region 220 may not be capable of accommodating the GOA unit. If the minimum distance D1 is increased large enough to accommodate the GOA unit, it may not be conducive to the design of the display device with a narrow bezel.

Figure 10B:
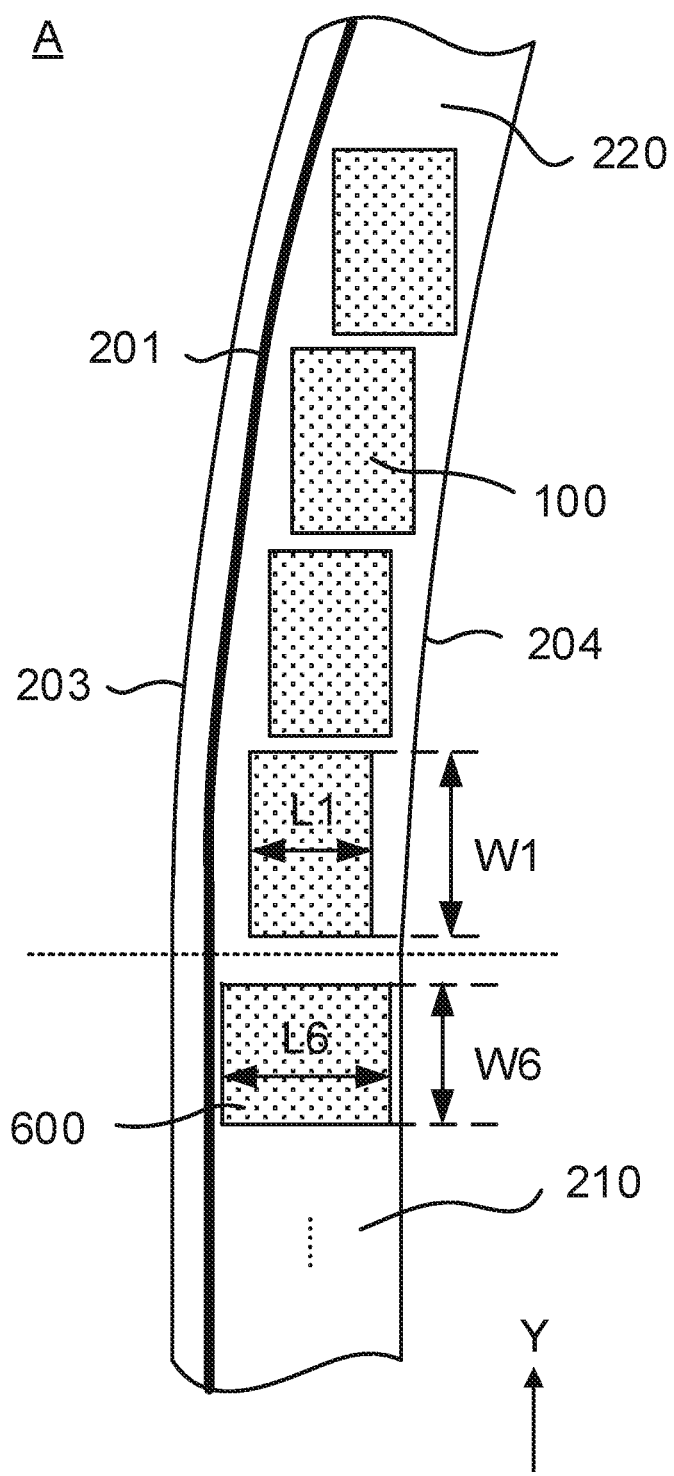
FIG. 10B is a schematic diagram showing an arrangement of GOA units in the section A of FIG. 2, in accordance with some embodiments.

In some embodiments of the present disclosure, as shown in FIGS. 10A and 10B, the GOA circuit 10 includes at least one GOA unit disposed in the rounded corner region 220 and a plurality of GOA units disposed in the first rectangular region 210 extending along the second direction OY.

Along the first direction OX, a length L1 of the GOA unit in the rounded corner region 220 (for example, the GOA unit 100 shown in FIG. 10B) is less than a length L6 of the GOA unit 600 in the first rectangular region 210. Along the second direction OY, a width W1 of the GOA unit in the rounded corner region 220 (for example, the GOA unit 100) is greater than a width W6 of the GOA unit 600 in the first rectangular region 210.

In some embodiments, as shown in FIG. 10A, the circuit substrate B1 further includes a data driver circuit 20 disposed in the second area 2. The data driver circuit 20 may be arranged in the second rectangular region 230 extending along the first direction OX.

Here, the GOA circuit 10 is electrically connected to the gate lines GL, and the data driver circuit 20 is electrically connected to the data lines DL. Each gate line GL is configured to transmit a gate scanning signal from the GOA circuit 10 to a corresponding pixel driver circuit. Each data line DL is configured to transmit a date signal from the data driver circuit 20 to a corresponding pixel driver circuit.

It can be understood that the circuit substrate B1 may include more than one GOA circuit 10 disposed in the second area 2. For example, as shown in FIG. 10A, the circuit substrate B1 includes two GOA circuits 10 disposed in two opposite first rectangular regions 210, respectively. The two opposite first rectangular regions 210 are located on two opposite sides of the first area 1, respectively. With regard to the structure of each GOA circuit 10, reference can be made to the above description.

In this way, the length of the GOA unit in the rounded corner region 220 may be small, which may make the GOA unit in the rounded corner region 220 not overlap, for example, the wire 201, in the second area 2. In addition, the width of the GOA unit in the rounded corner region 220 is increased, so that the GOA unit in the rounded corner region 220 may have enough space to accommodate components thereof (for example, TFTs of the GOA unit).

In some embodiments, referring to FIGS. 11, 17, 18 and 22, the rounded corner region 220 includes a first sub-region 111 and a second sub-region 112. The first sub-region 111 is connected to the first rectangular region 210, and the second sub-region 112 is connected to the second rectangular region 230. The GOA units disposed in the rounded corner region 220 include at least one first GOA unit 100 and at least one second GOA unit 200. The at least one first GOA unit 100 is disposed in the first sub-region 111, and the at least one second GOA unit 200 is disposed in the second sub-region 112. A length L1 of the first GOA unit 100 is less than a length L2 of the second GOA unit 200, and a width W1 of the first GOA unit 100 is greater than a width W2 of the second GOA unit 200.

For example, the length L1 of the first GOA unit 100 may be in a range from approximately 300 μm to approximately 320 μm, and the width W1 of the first GOA unit 100 may be in a range from approximately 250 μm to approximately 280 μm. In this case, the length L2 of the second GOA unit 200 may be in a range from approximately 400 μm to approximately 420 μm, and the width W2 of the second GOA unit 200 may be in a range from approximately 160 μm to approximately 190 μm.

For example, the length L1 of the first GOA unit 100 may be 313 μm, and the width W1 of the first GOA unit 100 may be 270 μm. The length L2 of the second GOA unit 200 may be 412 μm, and the width W2 of the second GOA unit 200 may be 177 μm.

Figure 11:
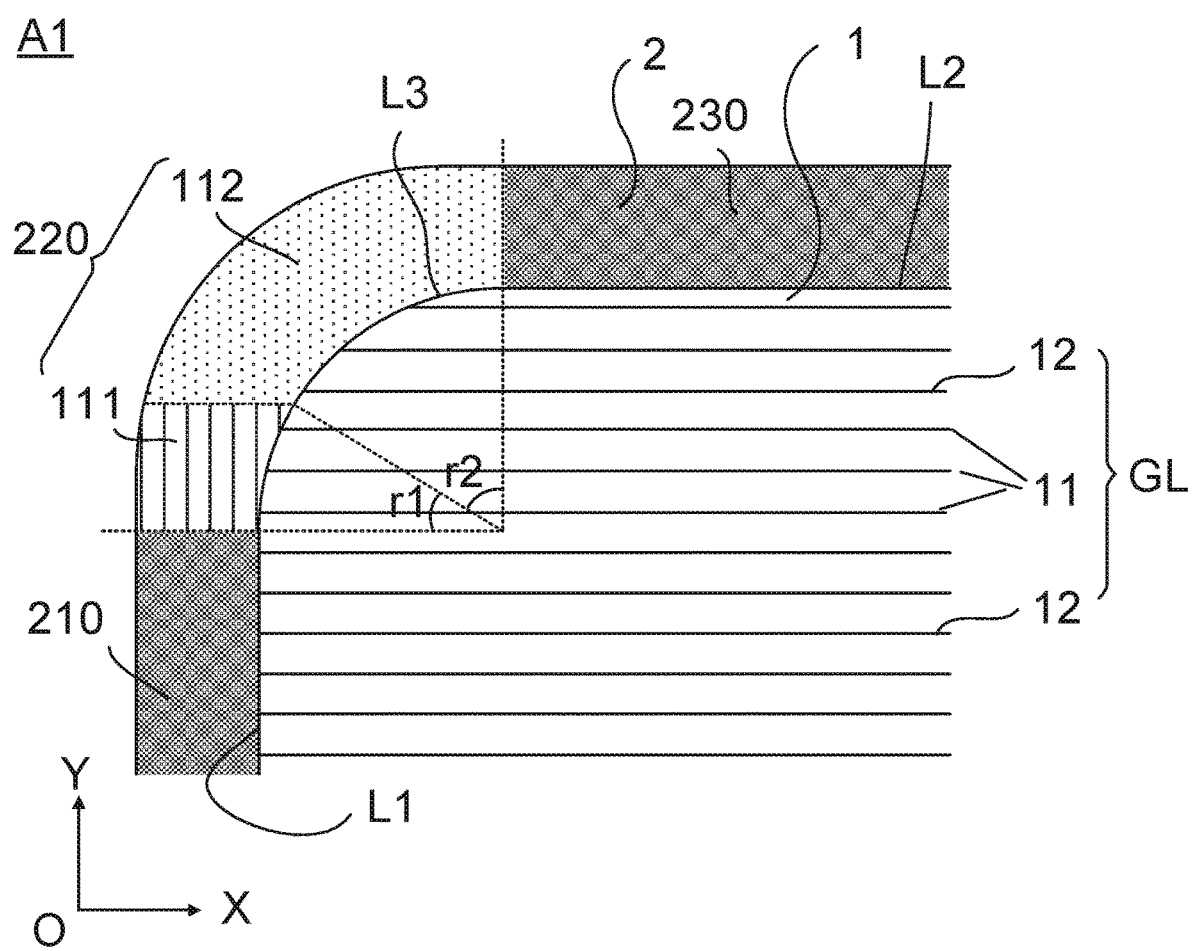
FIG. 11 is a schematic diagram showing a distribution of sub-regions of the rounded corner region in the section A1 of FIG. 10A.

Here, as shown in FIG. 11, each first GOA unit 100 and each second GOA unit 200 may be connected to corresponding gate lines GL, respectively.

In this way, the rounded corner region 220 may be sufficient to accommodate the GOA units, and the GOA units will not occupy the space of the second rectangular region 230.

In some examples, with continued reference to FIG. 11, the first sub-region 111 has a first central angle r1, and the second sub-region 112 has a second central angle r2. The first central angle r1 is less than the second central angle r2. The central angle here and hereafter refers to a central angle corresponding to an arc edge of the sub-region located at the inner border of the second area 2. Besides, it can be understood that a border between two adjacent sub-regions is substantially parallel with the first direction OX here and hereafter, and the border between two adjacent sub-regions is connected to corresponding ends of the arc edges of the two adjacent sub-regions.

In some examples, the first central angle r1 is in a range from approximately 5° to approximately 45°, such as 5°, 15°, 25°, 35°, or 45°.

Here, the at least one first GOA unit 100 may include a plurality of first GOA units 100, and the plurality of first GOA units 100 may be arranged in the first sub-region 111 along an inner border of the first sub-region 111. For example, the lengths of the plurality of first GOA units 100 may be the same, and the widths of the plurality of first GOA units 100 may be the same. For another example, the lengths of the plurality of first GOA units 100 may increase in a direction away from the first rectangular region 210, and the widths the plurality of first GOA units 100 may decrease in a direction away from the first rectangular region 210.

The at least one second GOA unit 200 may include a plurality of second GOA units 200, and the plurality of second GOA units 200 may be arranged in the second sub-region 112 along an inner border of the second sub-region 112. For example, the lengths of the plurality of second GOA units 200 may be the same, and the widths of the plurality of second GOA units 200 may be the same. For another example, the lengths of the plurality of second GOA units 200 may increase in a direction away from the first rectangular region 210, and the widths the plurality of second GOA units 200 may decrease in a direction away from the first rectangular region 210.

Figure 12:
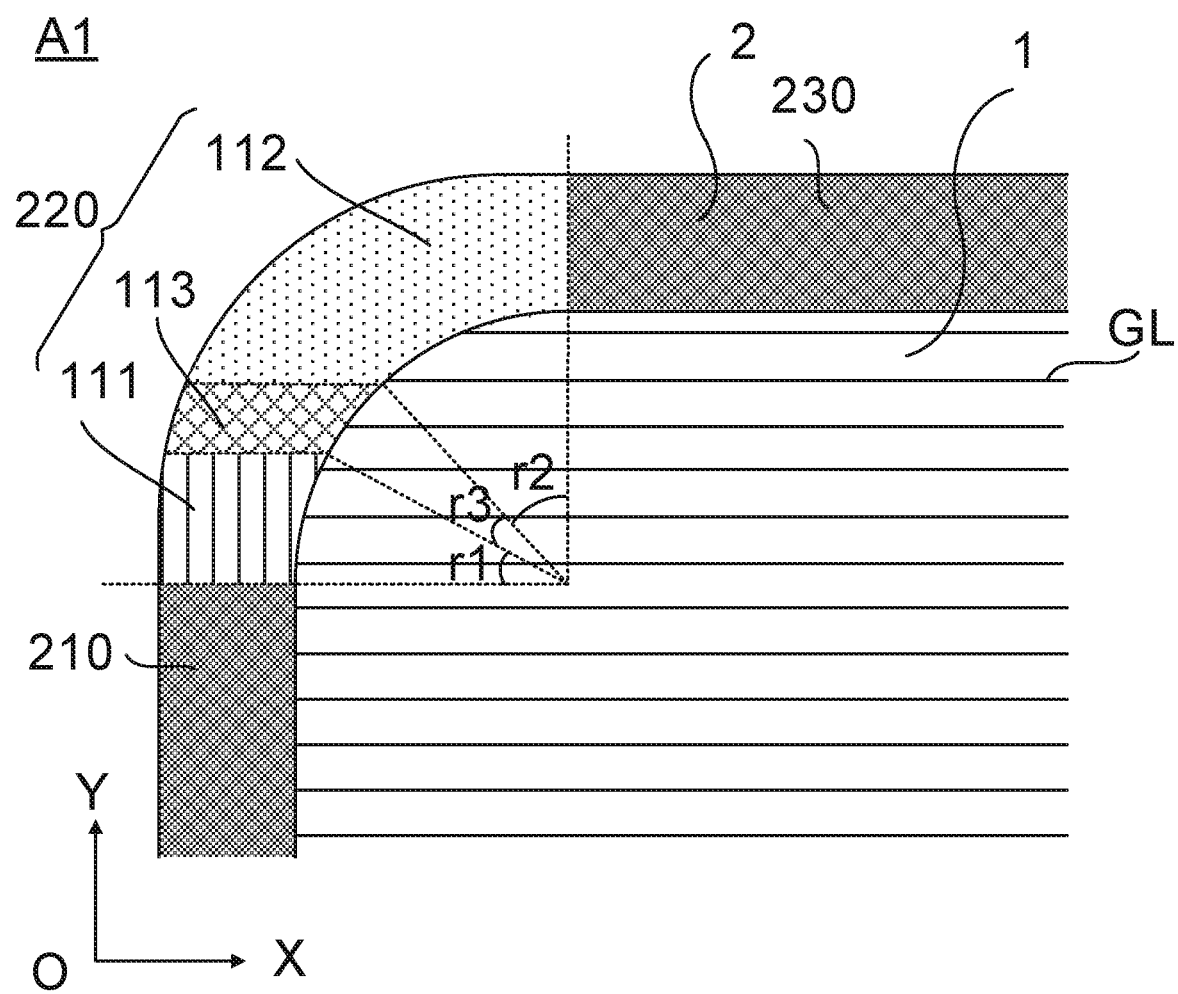
FIG. 12 is a schematic diagram showing another distribution of sub-regions of the rounded corner region in the section A1 of FIG. 10A.
Figure 22:
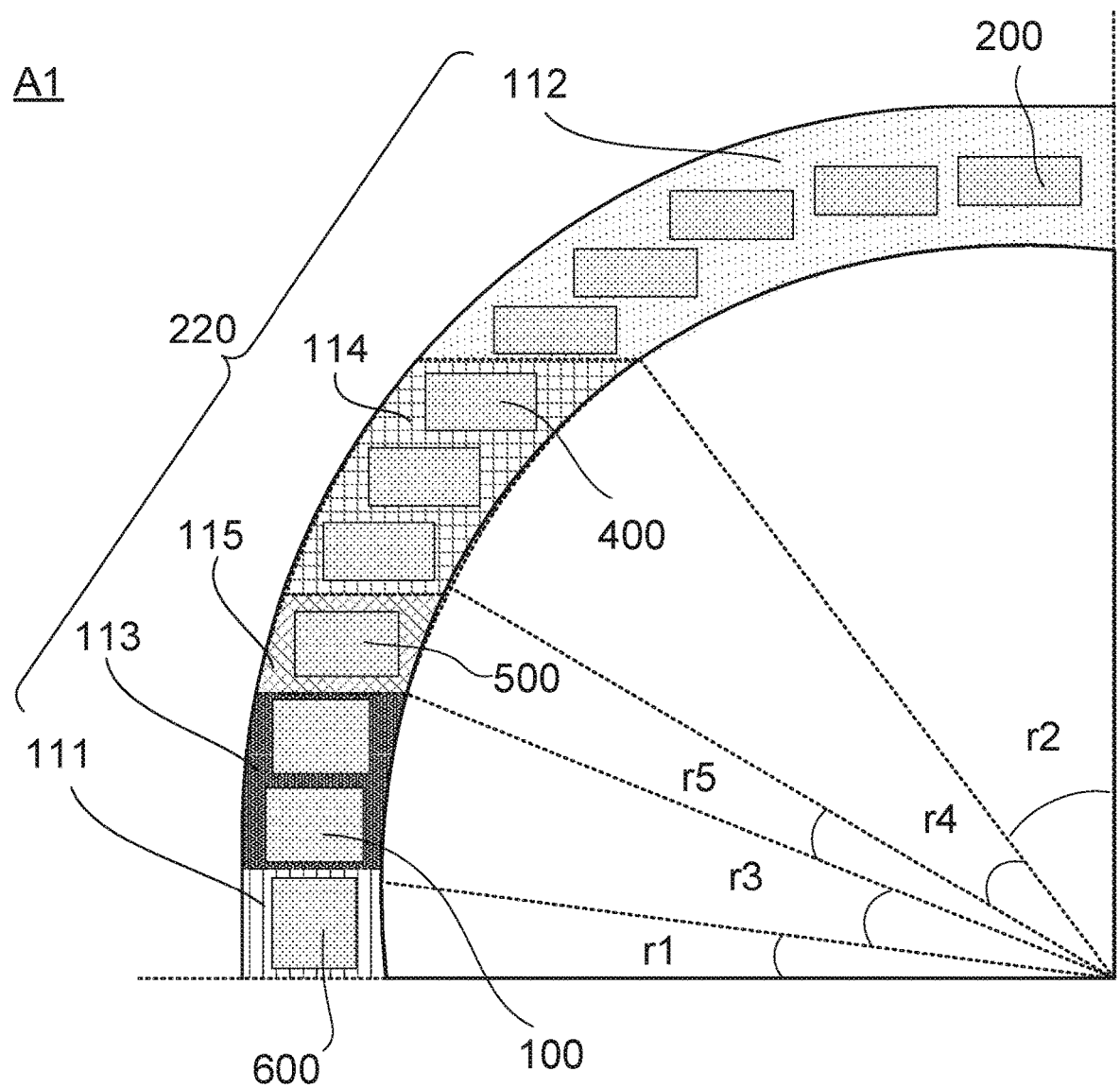
FIG. 22 is a schematic diagram showing an arrangement of GOA units in different sub-regions, in accordance with some embodiments.

In some embodiments, referring to FIGS. 12 and 22, the rounded corner region 220 further includes a third sub-region 113 between the first sub-region 111 and second sub-region 112. The GOA units disposed in the rounded corner region 220 further include at least one third GOA unit 300. The at least one third GOA unit 300 is disposed in the third sub-region 113.

Along the first direction OX, a length of the third GOA unit 300 is greater than the length of the first GOA unit 100, and less than the length of the second GOA unit 200. Along the second direction OY, a width of the third GOA unit 300 is less than the width of first GOA unit 100, and greater than the width of the second GOA unit 200.

Here, as shown in FIG. 12, each third GOA unit 300 may be connected to a corresponding gate line GL.

In some examples, with continued reference to FIG. 12, the third sub-region 113 has a central angle r3. The first central angle r1 of the first sub-region 111 is less than the second central angle r2 of the second sub-region 112, and the third central angle r3 of the third sub-region 113 is less than the first central angle r1 of the first sub-region 111. That is, the relationship of the central angles r1, r2, and r3 is that the third central angle r3 is less than the first central angle r1, and the first central angle r1 is less than the second central angle r2, so that the first GOA units and the second GOA units are disposed as many as possible in the arc-shaped region, which reduces the complexity of the wiring of the GOA unit.

Here, the at least one third GOA unit 300 may include a plurality of third GOA units 300, and the plurality of third GOA units 300 may be arranged in the third sub-region 113 along an inner border of the third sub-region 113. For example, the lengths of the plurality of third GOA units 300 may be the same, and the widths of the plurality of third GOA units 300 may be the same. For another example, the lengths of the plurality of third GOA units 300 may increase in a direction away from the first rectangular region 210, and the widths the plurality of third GOA units 300 may decrease in a direction away from the first rectangular region 210.

Figure 13:
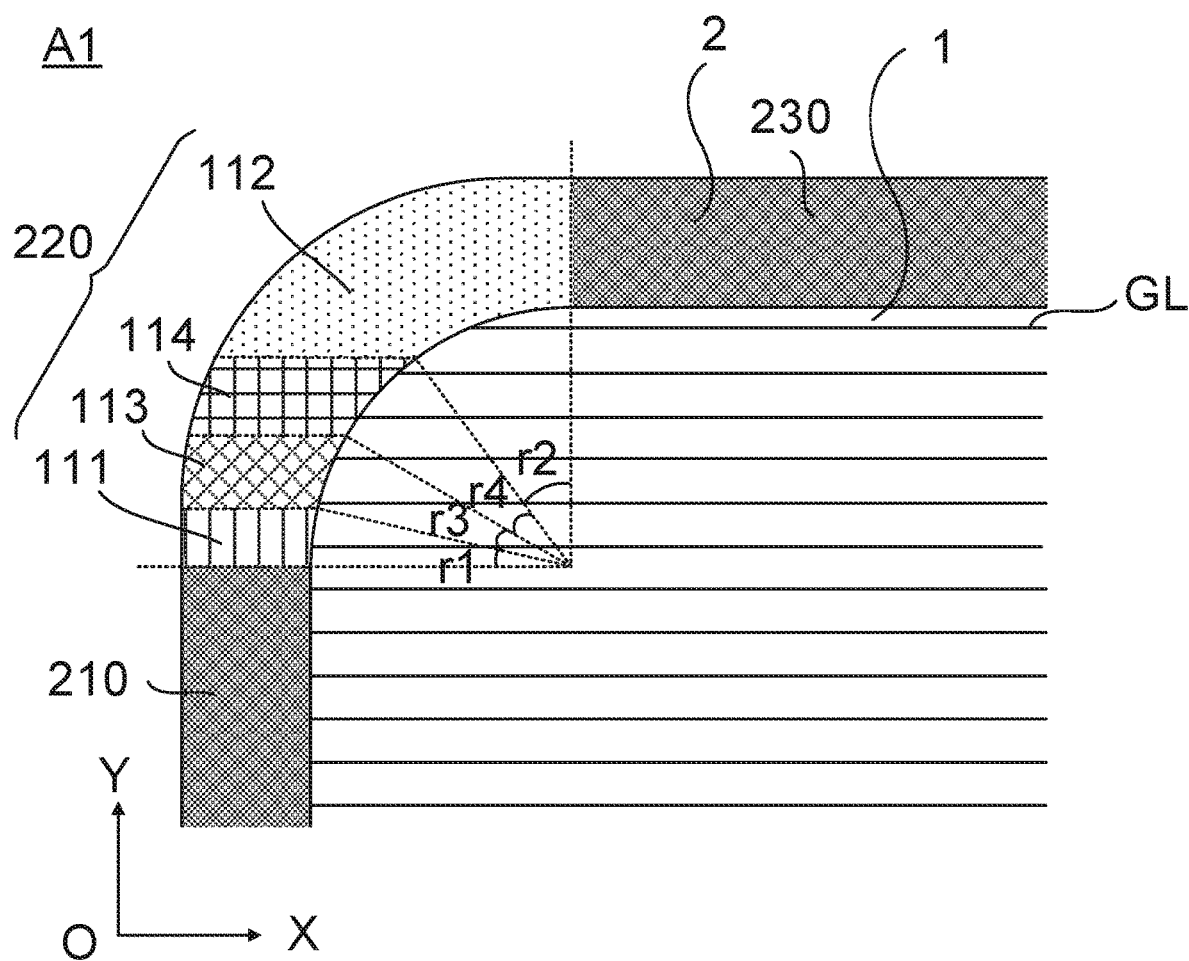
FIG. 13 is a schematic diagram showing yet another distribution of sub-regions of the rounded corner region in the section A1 of FIG. 10A.

In some embodiments, referring to FIGS. 13 and 22, the rounded corner region 220 further includes a fourth sub-region 114 between the third sub-region 113 and the second sub-region 112. The GOA units disposed in the rounded corner region 220 further include at least one fourth GOA unit 400. The at least one fourth GOA unit 400 is disposed in the fourth sub-region 114.

Along the first direction OX, a length of the fourth GOA unit 400 is greater than the length of the third GOA unit 300, and less than the length of the second GOA unit 200. Along the second direction OY, a width of the fourth GOA unit 400 is less than the width of the third GOA unit 300, and greater than the width of the second GOA unit 200.

Here, as shown in FIG. 13, each fourth GOA unit 400 may be connected to a corresponding gate line GL.

In some examples, with continued reference to FIG. 13, the fourth sub-region 114 has a fourth central angle r4. The first central angle r1 of the first sub-region 111 is less than the third central angle r3 of the third sub-region 113, the third central angle r3 of the third sub-region 113 is less than the fourth central angle r4 of the fourth sub-region 114, and the fourth central angle r4 of the fourth sub-region 114 is less than the second central angle r2 of the second sub-region 112. That is, the relationship of the central angles r1, r2, r3, and r4 is that the first central angle r1 is less than the third central angle r3, the third central angle r3 is less than the fourth central angle r4, and the fourth central angle r4 is less than the second central angle r2.

Here, the at least one fourth GOA unit 400 may include a plurality of fourth GOA units 400, and the plurality of fourth GOA units 400 may be arranged in the fourth sub-region 114 along an inner border of the fourth sub-region 114. For example, the lengths of the plurality of fourth GOA units 400 may be the same, and the widths of the plurality of fourth GOA units 400 may be the same. For another example, the lengths of the plurality of fourth GOA units 400 may increase in a direction away from the first rectangular region 210, and the widths the plurality of fourth GOA units 400 may decrease in a direction away from the first rectangular region 210.

Figure 14:
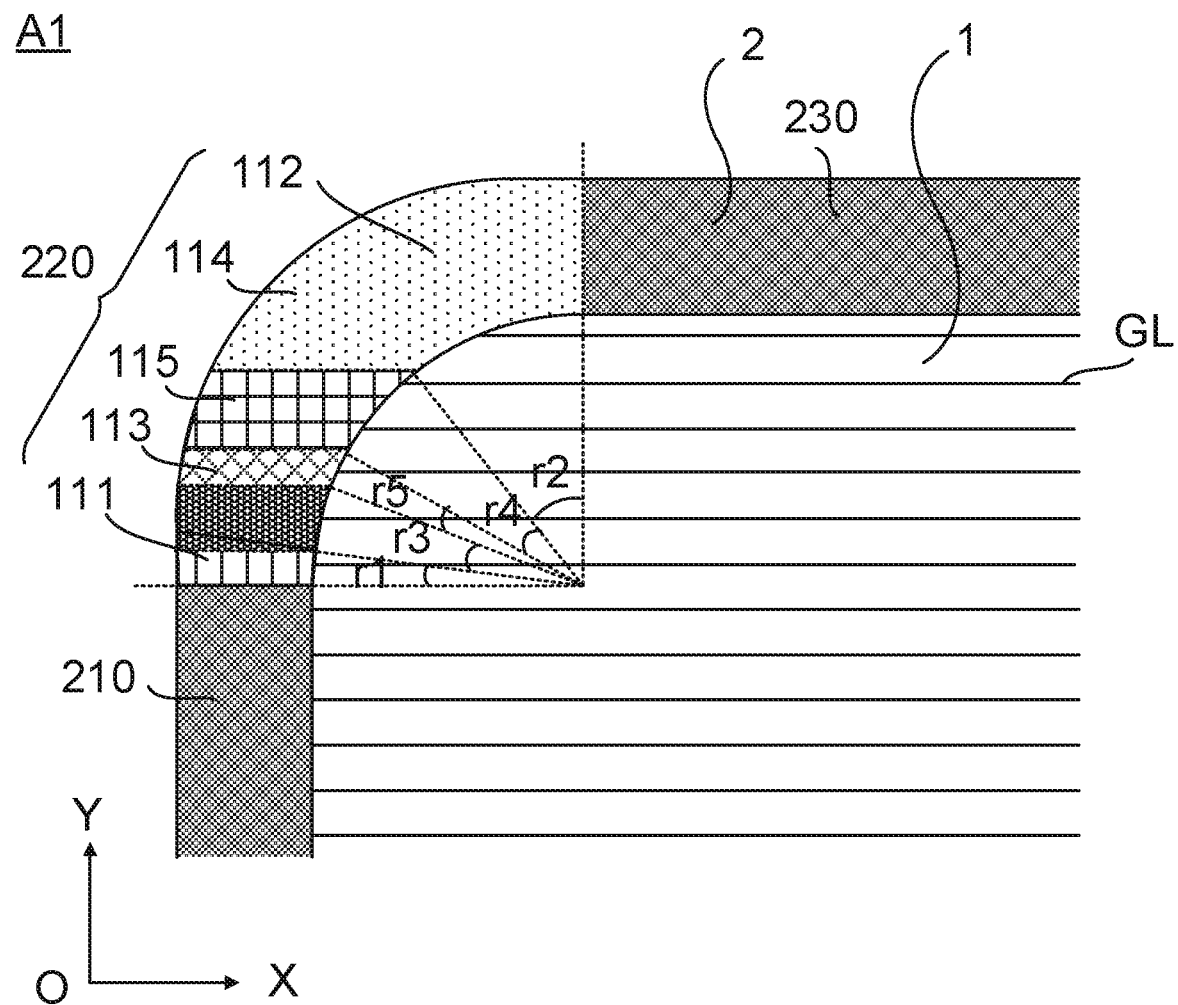
FIG. 14 is a schematic diagram showing yet another distribution of sub-regions of the rounded corner region in the section A1 of FIG. 10A.

In some embodiments, referring to FIGS. 14 and 22, the rounded corner region 220 further includes a fifth sub-region 115 between the third sub-region 113 and the fourth sub-region 114. The GOA units disposed in the rounded corner region 220 further include at least one fifth GOA unit 500.

Along the first direction OX, a length of the fifth GOA unit 500 is greater than the length of the third GOA unit 300, and less than the length of the fourth GOA unit 400. Along the second direction OY, a width of the fifth GOA unit 500 is less than the width of the third GOA unit 300, and greater than the width of the fourth GOA unit 400.

Here, as shown in FIG. 14, each fifth GOA unit 500 may be connected to a corresponding gate line GL.

In some examples, with continued reference to FIG. 14, the fifth sub-region 115 has a fifth central angle r5. The first central angle r1 of the first sub-region 111 is less than the third central angle r3 of the third sub-region 113, the third central angle r3 of the third sub-region 113 is less than the fourth central angle r4 of the fourth sub-region 114, and the fourth central angle r4 of the fourth sub-region 114 is less than the second central angle r2 of the second sub-region 112. And, the fifth central angle r5 of the fifth sub-region 115 is less than the third central angle r3 of the third sub-region 113. That is, the relationship of the central angles r1, r2, r3, r4 and r5 is that the first central angle r1 is less than the third central angle r3, the third central angle r3 is less than the fourth central angle r4, the fourth central angle r4 is less than the second central angle r2, and the fifth central angle r5 is less than the third central angle r3.

Here, the at least one fifth GOA unit 500 may include a plurality of fifth GOA units 500, and the plurality of fifth GOA units 500 may be arranged in the fifth sub-region 115 along an inner border of the fifth sub-region 115. For example, the lengths of the plurality of fifth GOA units 500 may be the same, and the widths of the plurality of fifth GOA units 500 may be the same. For another example, the lengths of the plurality of fifth GOA units 500 may increase in a direction away from the first rectangular region 210, and the widths the plurality of fifth GOA units 500 may decrease in a direction away from the first rectangular region 210.

In this way, since the first GOA unit 100, the second GOA unit 200, the third GOA unit 300, the fourth GOA unit 400 and the fifth GOA unit 500 are provided in the rounded corner region 220 and they have different sizes, in the second direction OY, a distance between one GOA unit and a corresponding gate line connected to the GOA unit may be well adjusted. As a result, the distance between the GOA unit and the corresponding gate line may be small, which may reduce a length of a wire connected the GOA unit and the corresponding gate line, and the complexity of wiring of the GOA unit is reduced.

It will be noted that the lengths of the first GOA units 100 to the fifth GOA units 500 gradually increase, and widths of the first GOA units to the fifth GOA units 500 gradually decrease. In other words, there may not be significant change in the lengths and the widths of the GOA units in two adjacent sub-regions of the rounded corner region 220. As a result, the GOA units disposed in the rounded corner region 220 may well fit the rounded corner region 220, and the utilization rate of area of the second area 02 may be increased, which is conducive to the design of a narrow bezel of the display device.

In some embodiments, more sub-regions and more GOA units of different sizes may be arranged in the rounded corner region 220. In some examples, the rounded corner region 220 includes a plurality of sub-regions arranged along the border of the first area 01. In a direction along the border of the first area 1 away from the first rectangular region 210, the lengths of GOA units disposed in the plurality of sub-regions increase, and the widths of the GOA units disposed in the plurality of sub-regions decrease. At least one GOA unit in each sub-region may have a same length and a same width. For another example, at least one GOA unit in each sub-region has a different length and/or a different width. Since the GOA units disposed in the rounded corner region 220 have a plurality of sizes, the GOA units may well fit the rounded corner region 220.

In some embodiments, referring to FIGS. 10A to 14, lengths and widths of the GOA units 600 disposed in the first rectangular region 210 are substantially equal to a length and a width of a GOA unit disposed in a sub-region connected to the second rectangular region 230.

In some embodiments, the GOA circuit 10 further includes at least one GOA unit disposed in the second rectangular region 230. In this case, for example, a length and a width of the GOA unit disposed in the second rectangular region 230 are substantially equal to the length and the width of the GOA unit disposed in the sub-region connected to the second rectangular region 230, respectively.

On this basis, the GOA units disposed in the second rectangular region 230 may be the same as the GOA unit disposed in the sub-region connected to the second rectangular region 230. The GOA units disposed in the first rectangular region 210 may be the same as the GOA unit disposed in the sub-region connected to the second rectangular region 230.

In some embodiments, as shown in FIG. 10A, two GOA circuits 10 are disposed in two opposite first rectangular regions 210 of the second area 02, respectively, and the two opposite first rectangular regions 210 of the second area 02 are respectively located on two opposite sides of the first area 1 (for example, the left side SA and right side SB as shown in FIG. 10A).

In this case, in the GOA circuit 10 corresponding to one side (e.g., the left side SA), the GOA units may be connected to gate lines GL in odd lines. In the GOA circuit 10 corresponding to the other one side (e.g., the right side SB), the GOA units may be connected to gate lines GL in even lines, so that gate scanning signals are alternately output from the two GOA circuits 10 disposed on the two opposite sides of the first area 01.

For another example, each gate line GL is connected to the two GOA circuits 10. One end of the gate line GL is connected to a GOA unit disposed on one side of the first area 1 (e.g., the left side SA), and the other end of the gate line GL is connected to a GOA unit disposed on the other side of the first area 1 (e.g., the right side SB). In this way, a bilateral driving of the display panel 001 is realized, that is, two gate scanning signals are respectively output to both ends of the gate line GL, which may improve the signal delay (RC delay) of the display panel 001 caused by the RC load.

Figure 15:
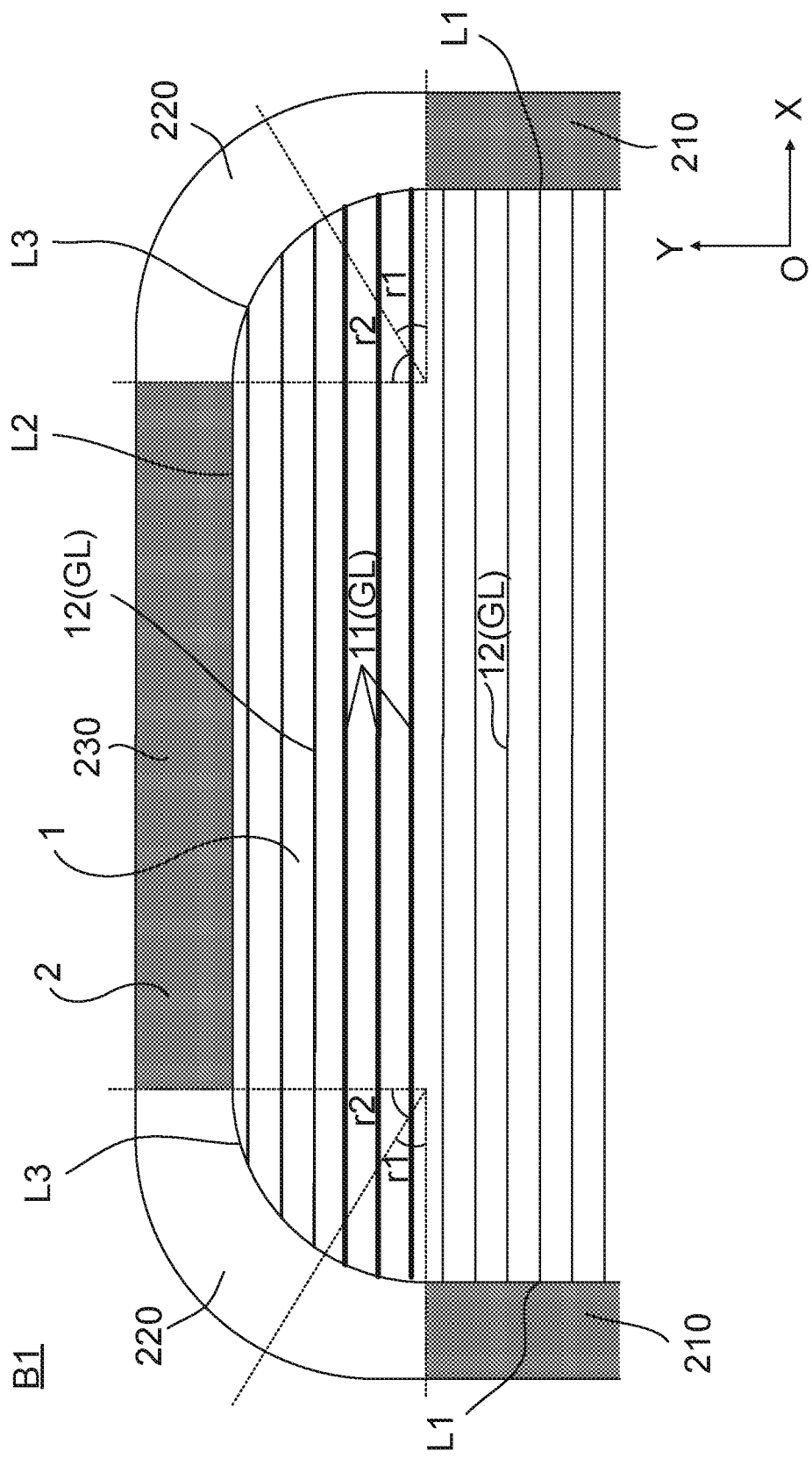
FIG. 15 is a schematic top view showing a partial structure of a circuit substrate, in accordance with some embodiments.
Figure 16:
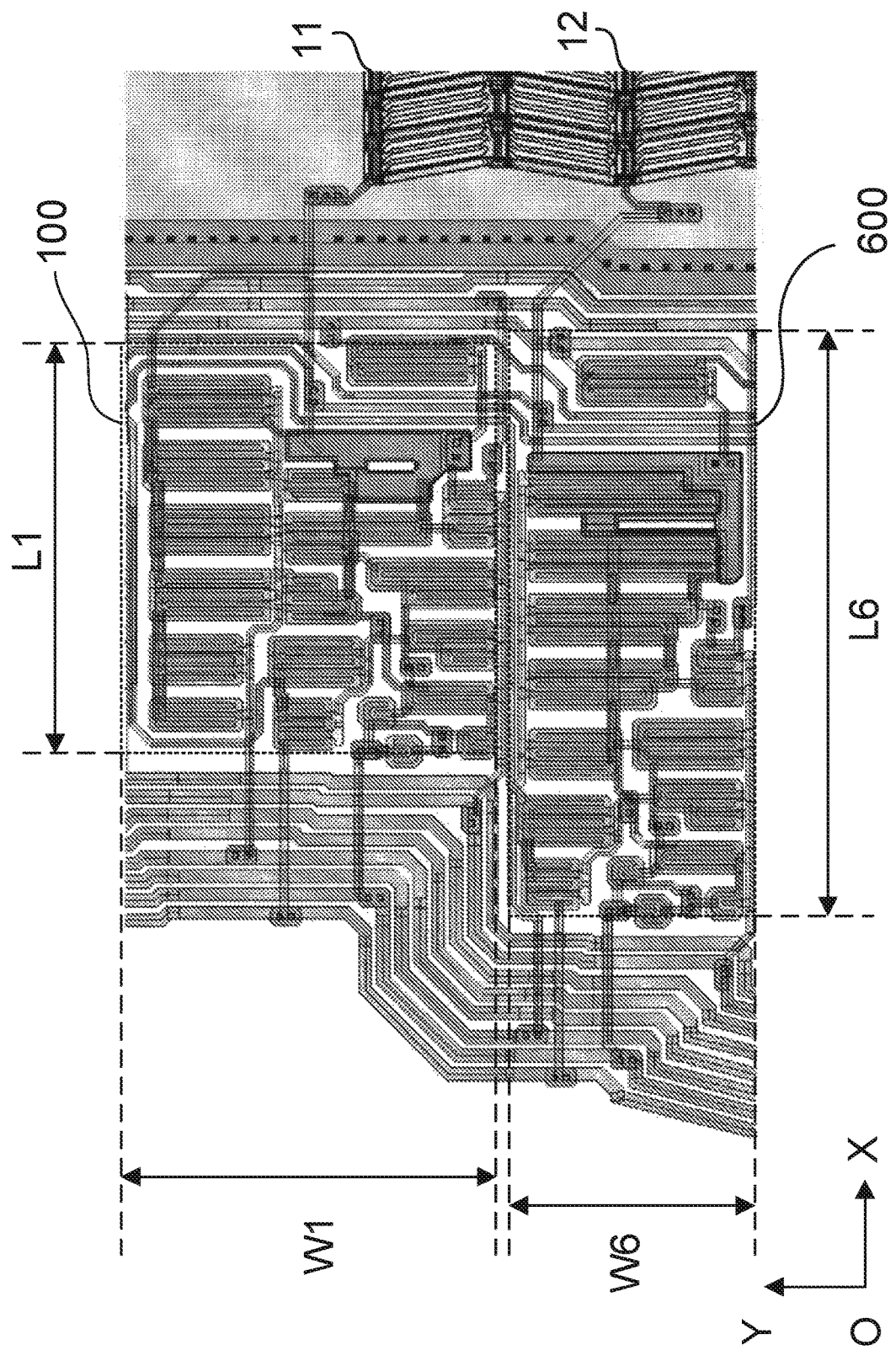
FIG. 16 is a schematic diagram showing a first GOA unit and a GOA unit in the first rectangular region, in accordance with some embodiments.

In some embodiments, as shown in FIG. 15, the first area 1 includes at least one first border L1 and at least one second border L2, and the first border L1 and the second border L2 are both connected to the curved border L3. The first border L1 extends along the second direction OY, and the second border L2 extends along the first direction OX.

For example, as shown in FIG. 15, the first area 1 includes two opposite first borders L1, and the two first borders L1 are connected to the second border L2 through two different curved borders L3.

On this basis, in some embodiments, as shown in FIG. 11, the plurality of gate lines GL in the first area 1 includes a plurality of first gate lines 11 and a plurality of second gate lines 12. The plurality of first gate lines 11 correspond to the first sub-region 111 of the rounded corner region 220, and the plurality of second gate lines 12 correspond to the second sub-region 112 of the rounded corner region 220 and the first rectangular region 210.

The plurality of first GOA units 100 and the plurality of second GOA units 200 are arranged along the curved borders L3, and connected to corresponding gate lines GL. Each first GOA unit 100 is connected to a respective one of the plurality of first gate lines 11, and each second GOA unit 200 is connected to a corresponding second gate line 12.

Structures of the first GOA unit 100 and the second GOA 200 unit will be exemplarily described below with reference to FIGS. 17 and 18.

Here, it will be noted that, equivalent circuits diagram of the first GOA unit 100 and the second GOA unit 200 are the same (that is, electrical connections of elements in the first GOA unit 100 is the same as electrical connections of elements in the second GOA unit 200), and a difference between the first GOA unit 100 and the second GOA unit 100 is that arrangements of wires (the arrangement manners of circuits and components) are different.

Figure 17:
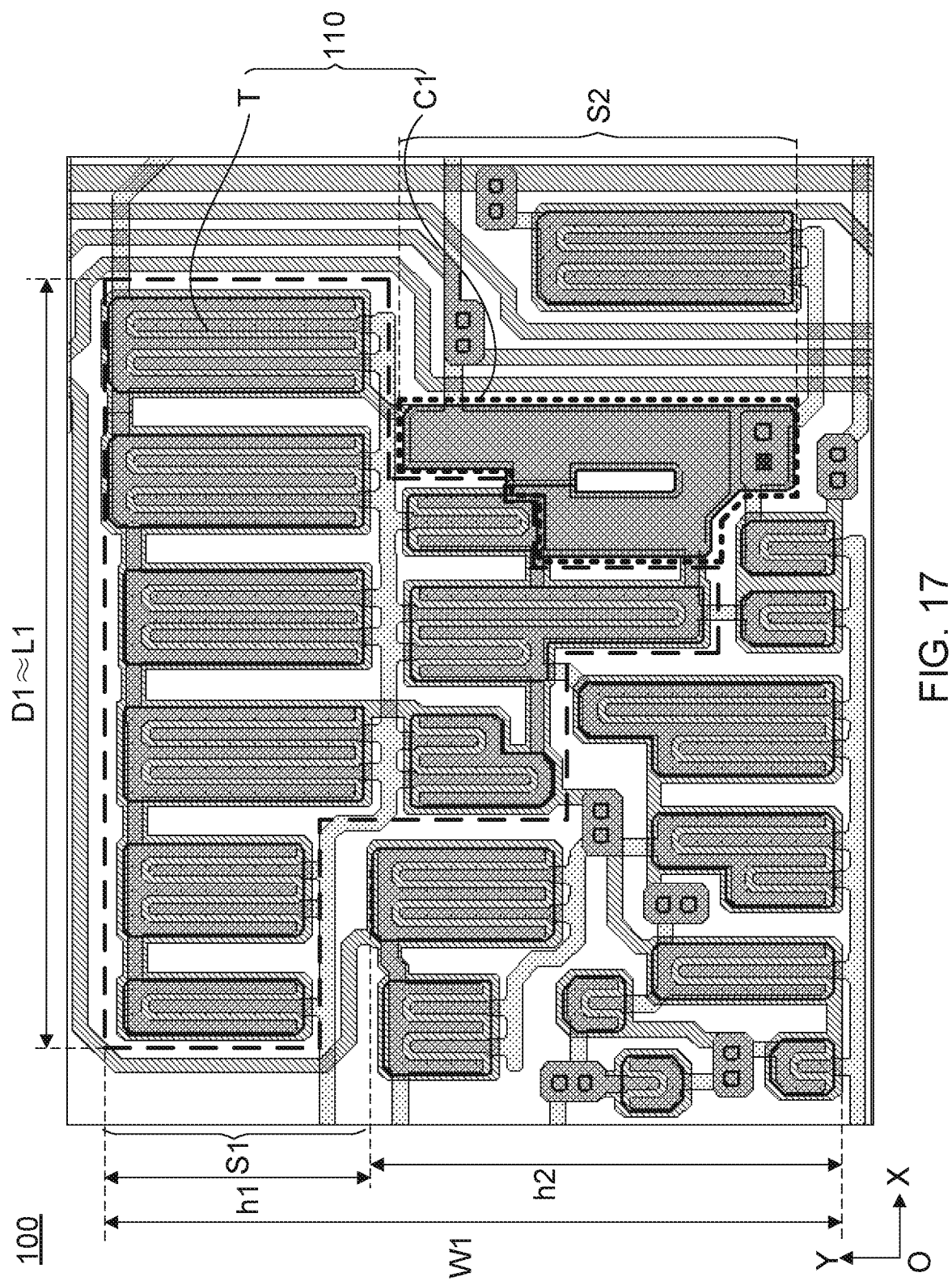
FIG. 17 is a schematic diagram of a first GOA unit, in accordance with some embodiments.

As shown in FIG. 17, the first GOA unit 100 includes a first output sub-circuit 110 connected to a corresponding gate line GL. The first output sub-circuit 110 includes a plurality of first transistors T. The plurality of first transistors T are arranged in multiple rows each extending along the first direction OX. Here, it can be understood that each row includes at least one first transistor T.

For example, as shown in FIG. 17, in the first GOA unit 100, the plurality of first transistors T are arranged in a first row and a second row each of which extends along the first direction OX. The first row is arranged in a first distribution region S1 of the first GOA unit 100, and the second row is arranged in a second distribution region S2 of first GOA unit 100.

Along the first direction OX, a length D1 of the first distribution region S1 is equal to or substantially equal to the length L1 of the first GOA unit 100. Along the second direction OY, a sum of a width h1 of the first distribution region S1 and a width h2 of the second distribution region S2 is equal to or substantially equal to the width W1 of the first GOA unit 100. That is, a sum of h1 and h2 is equal to or substantially equal to W1.

As shown in FIG. 17, the first output sub-circuit 110 may further include a first capacitor C1.

Figure 18:
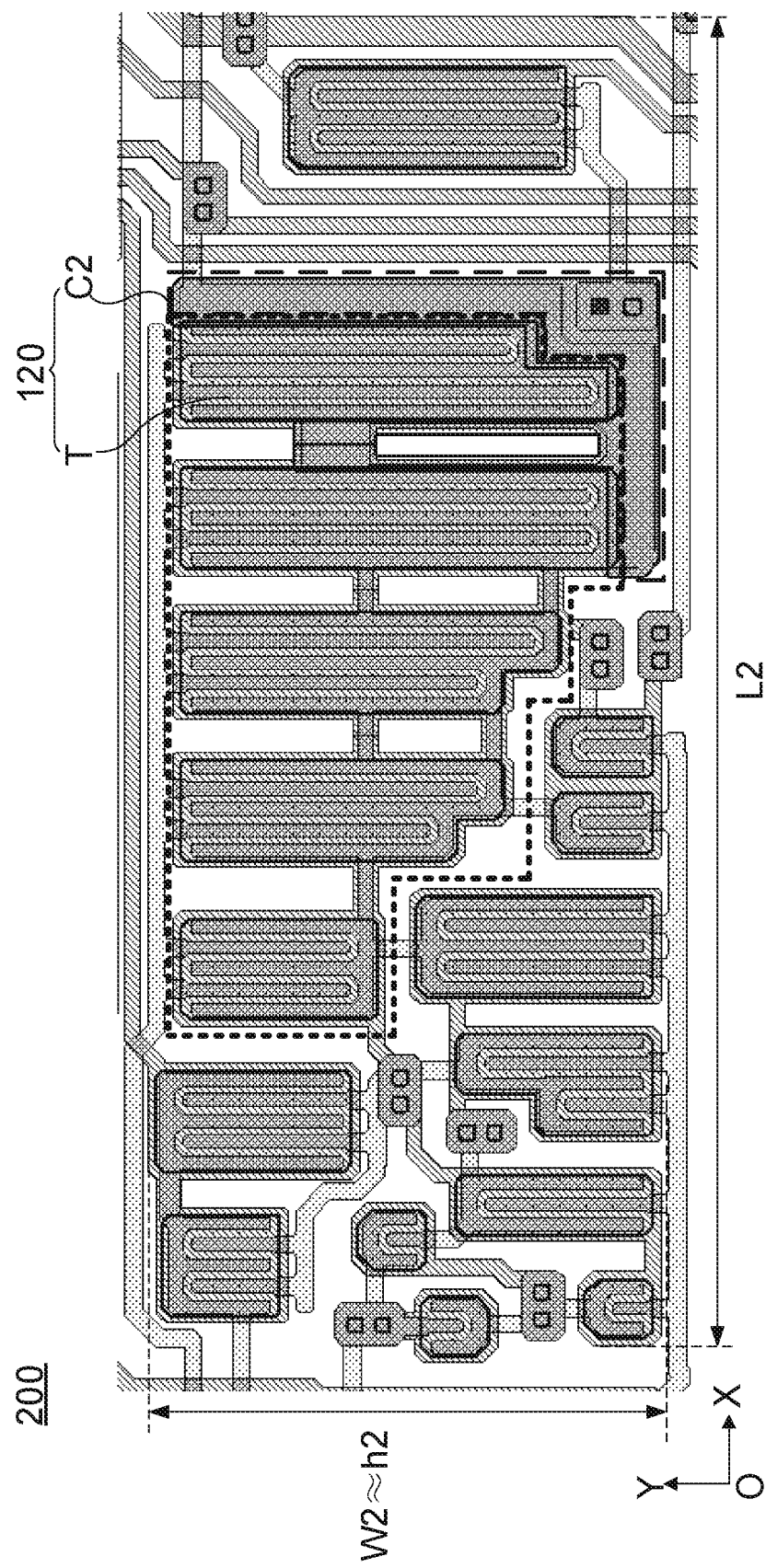
FIG. 18 is a schematic diagram of a second GOA unit, in accordance with some embodiments.

As shown in FIG. 18, the second GOA unit 200 includes a second output sub-circuit 120 connected to a corresponding gate line GL. The second output sub-circuit 120 includes a plurality of second transistors T, and the plurality of second transistors T are arranged in one row extending along the first direction OX.

The width W2 of the second GOA unit 200 is equal to or substantially equal to the width h2 of the second distribution region S2 in the first GOA unit 100.

In this case, it can be understood that a difference ΔH between the width W1 of the first GOA unit 100 and the width W2 of the second GOA unit 200 is equal to or substantially equal to a difference between a sum of h1 and h2 and h2, that is, ΔH is equal to or substantially equal to h1.

As shown in FIG. 18, the second output sub-circuit 120 may further include a second capacitor C2.

The GOA units 600 in the first rectangular region 210 will be exemplarily described below with reference to FIGS. 10B and 19. For ease of distinction, the GOA units 600 in the first rectangular region 210 are referred to as original GOA units 600.

Figure 19:
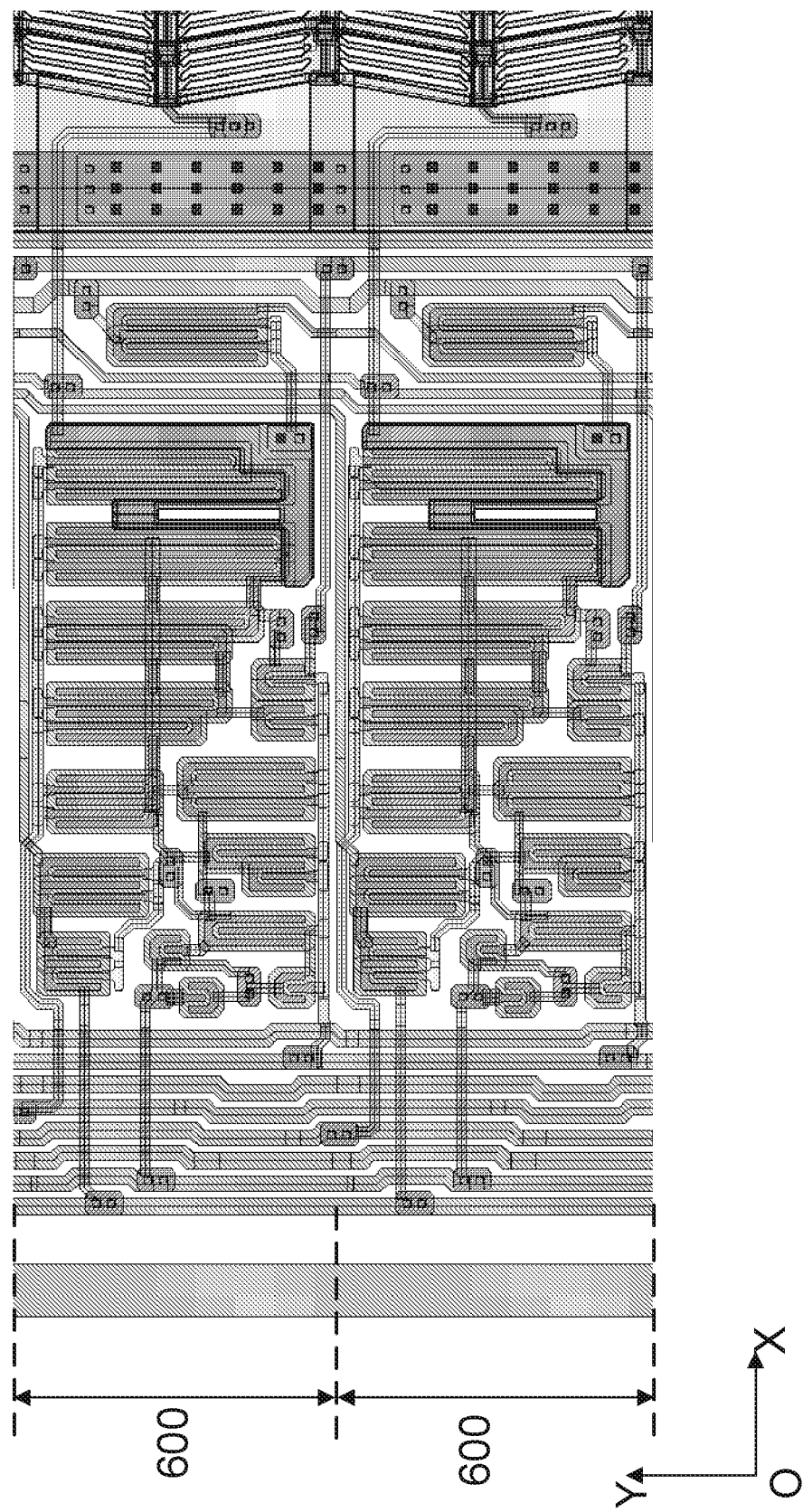
FIG. 19 is a schematic diagram showing an arrangement of GOA units in the first rectangular region, in accordance with some embodiments.

As shown in FIGS. 19 and 10B, in the first rectangular region 210, the original GOA units 600 are disposed adjacent to each other. Edges of the plurality of original GOA units 600 adjacent to the first area 1 are flush with each other, and edges of the plurality of original GOA units 600 away from the first area 1 are flush with each other.

In addition, the arrangement of the first GOA unit 100 and the second GOA unit 200 in some embodiments will be exemplarily described below with reference to FIGS. 11, 20 and 21.

Figure 20:
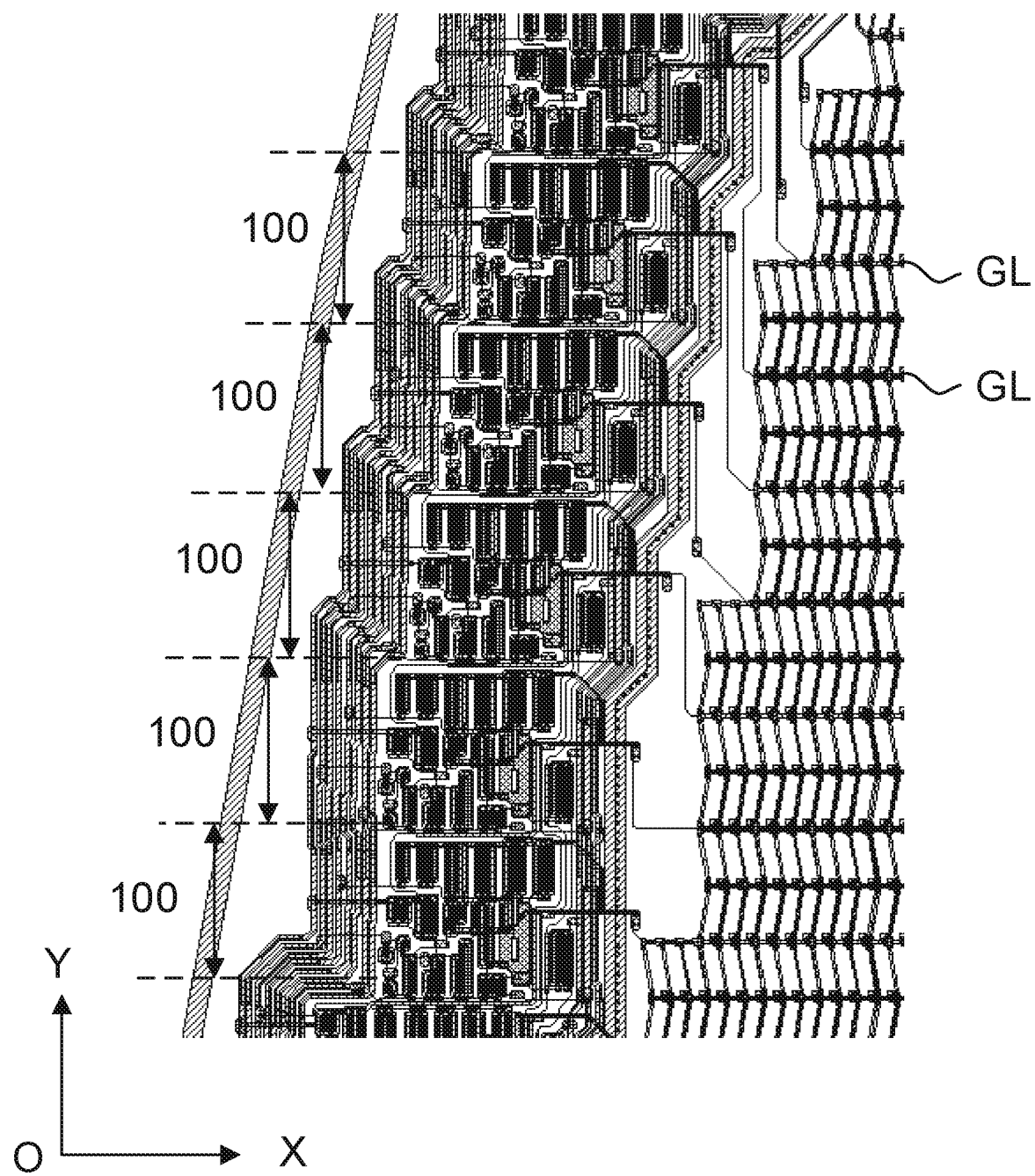
FIG. 20 is a diagram showing an arrangement of GOA units in the rounded corner region, in accordance with some embodiments.

As shown in FIG. 20, in the first sub-region 111, the first GOA units 100 are arranged along an inner border of the first sub-region 111, and each first GOA unit 100 is connected to a corresponding gate line GL.

Here, it will be noted that, as shown in FIG. 20, the first GOA unit 100 and its corresponding gate line GL are not on a same level. A wire connecting the first GOA unit 100 to the corresponding gate line GL may be arranged according to actual positions of the first GOA unit 100 and the corresponding gate line GL.

Figure 21:
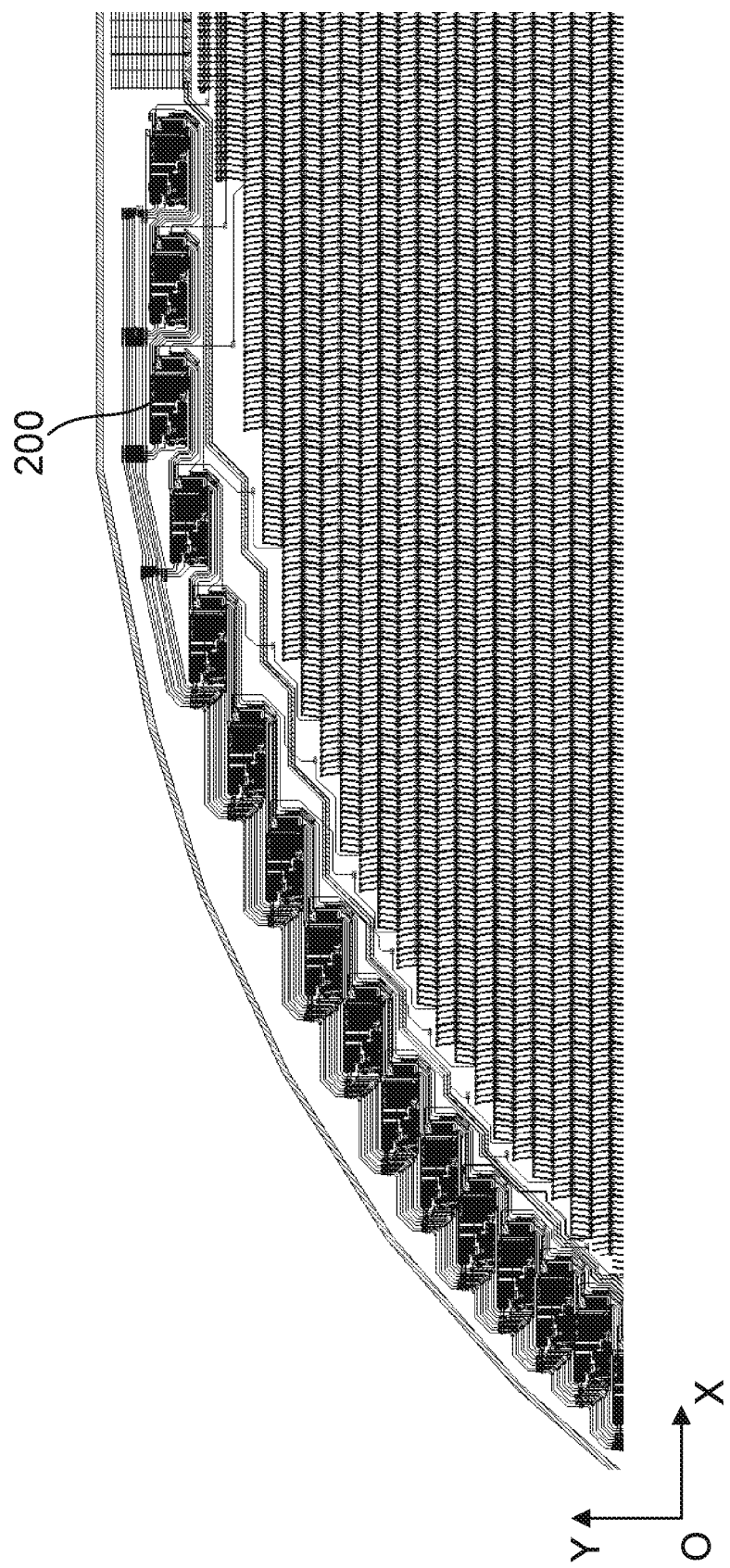
FIG. 21 is a diagram showing another arrangement of GOA units in the rounded corner region, in accordance with some embodiments.

As shown in FIG. 21, in the second sub-region 112, the second GOA units 200 are arranged along an inner border of the second sub-region 112, and each second GOA unit 100 is connected to a corresponding gate line GL.

Since the width of the second GOA unit 200 is less than the width of the first GOA unit 100 along the direction perpendicular to the extending direction of the gate lines (i.e., the second direction OY), an area of the second sub-region 112 occupied by the second GOA units 200 may be optimized, which may make better use of a space in the second sub-region 112.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A circuit substrate having a first area and a second area extending along at least part of an edge of the first area; the second area including a rounded corner region and a first rectangular region connected to the rounded corner region; the first rectangular region extending along a second direction; the circuit substrate comprising:
   a plurality of gate lines disposed in the first area, each gate line extending in a first direction perpendicular to the second direction; and
   a gate driver on array (GOA) circuit disposed in the second area and connected to at least part of the plurality of gate lines, the GOA circuit including at least one GOA unit disposed in the rounded corner region and a GOA unit disposed in the first rectangular region, wherein
   along the first direction, a length of a GOA unit in the rounded corner region is less than a length of the GOA unit in the first rectangular region; and along the second direction, a width of the GOA unit in the rounded corner region is greater than a width of the GOA unit in the first rectangular region, wherein
   the rounded corner region includes a plurality of sub-regions arranged along the edge of the first area; the at least one GOA unit in the rounded corner region includes a plurality of GOA units that are arranged in the plurality of sub-regions;
   in a direction along the edge of the first area away from the first rectangular region, lengths of the plurality of GOA units gradually increase, and widths of the plurality of GOA units gradually decrease.

2. The circuit substrate according to claim 1, wherein the second area further includes a second rectangular region extending along the first direction, the rounded corner region includes a first sub-region and a second sub-region, the first sub-region is connected to the first rectangular region, and the second sub-region is connected to the second rectangular region;
   the at least one GOA unit disposed in the rounded corner region includes a first GOA unit disposed in the first sub-region, and a second GOA unit disposed in the second sub-region, a length of the first GOA unit is less than a length of the second GOA unit, and a width of the first GOA unit is greater than a width of the second GOA unit.

3. The circuit substrate according to claim 2, wherein a first central angle of the first sub-region is smaller than a second central angle of the second sub-region.

4. The circuit substrate according to claim 2, wherein the first sub-region has a first central angle in a range from approximately 5° to approximately 45°.

5. The circuit substrate according to claim 2, wherein the rounded corner region further includes a third sub-region between the first sub-region and the second sub-region;
   the at least one GOA unit disposed in the rounded corner region further includes a third GOA unit disposed in the third sub-region, wherein
   a length of the third GOA unit is greater than the length of the first GOA unit, and less than the length of the second GOA unit; and a width of the third GOA unit is less than the width of the first GOA unit, and greater than the width of the second GOA unit.

6. The circuit substrate according to claim 5, wherein a first central angle of the first sub-region is less than a second central angle of the second sub-region, and a third central angle of the third sub-region is less than the first central angle.

7. The circuit substrate according to claim 5, wherein the rounded corner region further includes a fourth sub-region between the third sub-region and second sub-region;
   the at least one GOA unit disposed in the rounded corner region further includes a fourth GOA unit, wherein
   a length of the fourth GOA unit is greater than the length of the third GOA unit and less than the length of the second GOA unit; and a width of the fourth GOA unit is less than the width of the third GOA unit, and greater than the width of the second GOA unit.

8. The circuit substrate according to claim 7, wherein a first central angle of the first sub-region is less than a third central angle of the third sub-region, the third central angle is less than a fourth central angle of the fourth sub-region, and the fourth central angle is less than a second central angle of the second sub-region.

9. The circuit substrate according to claim 7, wherein the rounded corner region further includes a fifth sub-region between the third sub-region and the fourth sub-region;
   the at least one GOA unit disposed in the rounded corner region further includes a fifth GOA unit, wherein
   a length of the fifth GOA unit is greater than the length of the third GOA unit, and less than the length of the fourth GOA unit; and a width of the fifth GOA unit is less than the width of the third GOA unit, and greater than the width of the fourth GOA unit.

10. The circuit substrate according to claim 9, wherein a first central angle of the first sub-region is less than a third central angle of the third sub-region, the third central angle is less than a fourth central angle of the fourth sub-region, and the fourth central angle is less than a second central angle of the second sub-region; and a fifth central angle of the fifth sub-region is less than the third central angle.

11. The circuit substrate according to claim 2, wherein the first GOA unit and the second GOA unit are electrically connected to corresponding gate lines.

12. The circuit substrate according to claim 2, wherein the first GOA unit includes a first output sub-circuit connected to a corresponding gate line; the first output sub-circuit includes a plurality of first transistors arranged in a plurality of rows each extending along the first direction.

13. The circuit substrate according to claim 12, wherein the plurality of first transistors of the first output sub-circuit are arranged in a first row and a second row;
the first row of first transistors is arranged in a first distribution region, and the second row of first transistors is arranged in a second distribution region, wherein
along the first direction, a length of the first distribution region is equal to or substantially equal to the length of the first GOA unit; and
along the second direction, a sum of a width of the first distribution region and a width of the second distribution region is equal to or substantially equal to the width of the first GOA unit.

14. The circuit substrate according to claim 2, wherein the second GOA unit includes a second output sub-circuit connected to a corresponding gate line; the second output sub-circuit includes a plurality of second transistors, and the plurality of second transistors are arranged in a row extending along the first direction.

15. The circuit substrate according to claim 14, wherein along the second direction, a width of the second distribution region is equal to or substantially equal to the width of the second GOA unit.

16. The circuit substrate according to claim 1, wherein the second area further includes a second rectangular region extending along the first direction, and the rounded corner region is connected to the second rectangular region; and
the GOA circuit further includes a GOA unit disposed in the second rectangular region, a length and a width of the GOA unit in the second rectangular region and/or the length and the width of the GOA unit in the first rectangular region are substantially equal to a length and a width of a GOA unit in a sub-region of the rounded corner region that is connected to the second rectangular region, respectively.

17. A display device, comprising the circuit substrate according to claim 1.

* * * * *